US011603892B2

(12) United States Patent
Ozawa et al.

(10) Patent No.: US 11,603,892 B2
(45) Date of Patent: Mar. 14, 2023

(54) POWER TRANSMISSION DEVICE

(71) Applicant: Kabushiki Kaisha F.C.C., Hamamatsu (JP)

(72) Inventors: Yoshihiko Ozawa, Hamamatsu (JP); Han Hiong Chen, Hamamatsu (JP); Makoto Kataoka, Hamamatsu (JP); Masataka Murai, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 0 days.

(21) Appl. No.: 17/861,228

(22) Filed: Jul. 10, 2022

(65) Prior Publication Data

US 2022/0341475 A1 Oct. 27, 2022

Related U.S. Application Data

(63) Continuation of application No. 17/336,387, filed on Jun. 2, 2021, which is a continuation of application No. PCT/JP2019/047407, filed on Dec. 4, 2019.

(30) Foreign Application Priority Data

Dec. 5, 2018 (JP) .................. 2018-227994

(51) Int. Cl.
  *F16D 43/12* (2006.01)
  *F16D 13/52* (2006.01)
  *F16D 43/206* (2006.01)
(52) U.S. Cl.
  CPC ............. *F16D 43/12* (2013.01); *F16D 13/52* (2013.01); *F16D 43/206* (2013.01)
(58) Field of Classification Search
  CPC ........ F16D 43/12; F16D 43/206; F16D 13/52; F16D 23/12; F16D 2023/123
  See application file for complete search history.

(56) References Cited

U.S. PATENT DOCUMENTS

2015/0337910 A1   11/2015   Yoshimoto et al.
2021/0285509 A1   9/2021   Ozawa et al.

FOREIGN PATENT DOCUMENTS

| JP | 54-0140051 | 10/1979 |
| JP | 62-052228 | 3/1987 |
| JP | 2017-155883 A | 9/2017 |
| JP | 2017-155884 A | 9/2017 |

(Continued)

OTHER PUBLICATIONS

International Search Report dated Feb. 18, 2020 in corresponding PCT Application No. PCT/JP2019/047407.

*Primary Examiner* — Timothy Hannon
(74) *Attorney, Agent, or Firm* — Harness, Dickey & Pierce, P.L.C.

(57) ABSTRACT

A power transmission device has a first clutch member 4a coupled to an output member 3. A second clutch member 4b has a plurality of driven-side clutch plates 7. A back-torque transmitting cam presses the drive-side clutch plates 6 and the driven-side clutch plates 7 against each other by moving the second clutch member 4b when a rotational force is input to the first clutch member 4a. A cushioning member 12 is interposed between the first clutch member 4a and the second clutch member 4b. The cushioning member 12, by being compressed, applies an urging force while allowing movements of an interlocking member 9 and a pressure member 5 in a process where the interlocking member 9 moves and the pressure member 5 moves from the inactive position toward the active position.

7 Claims, 27 Drawing Sheets

(56) References Cited

FOREIGN PATENT DOCUMENTS

| | | |
|---|---|---|
| WO | WO-2013/183588 A1 | 12/2013 |
| WO | WO-2016/143551 A1 | 9/2016 |
| WO | WO-2018/116638 A1 | 6/2018 |

[Fig. 1]
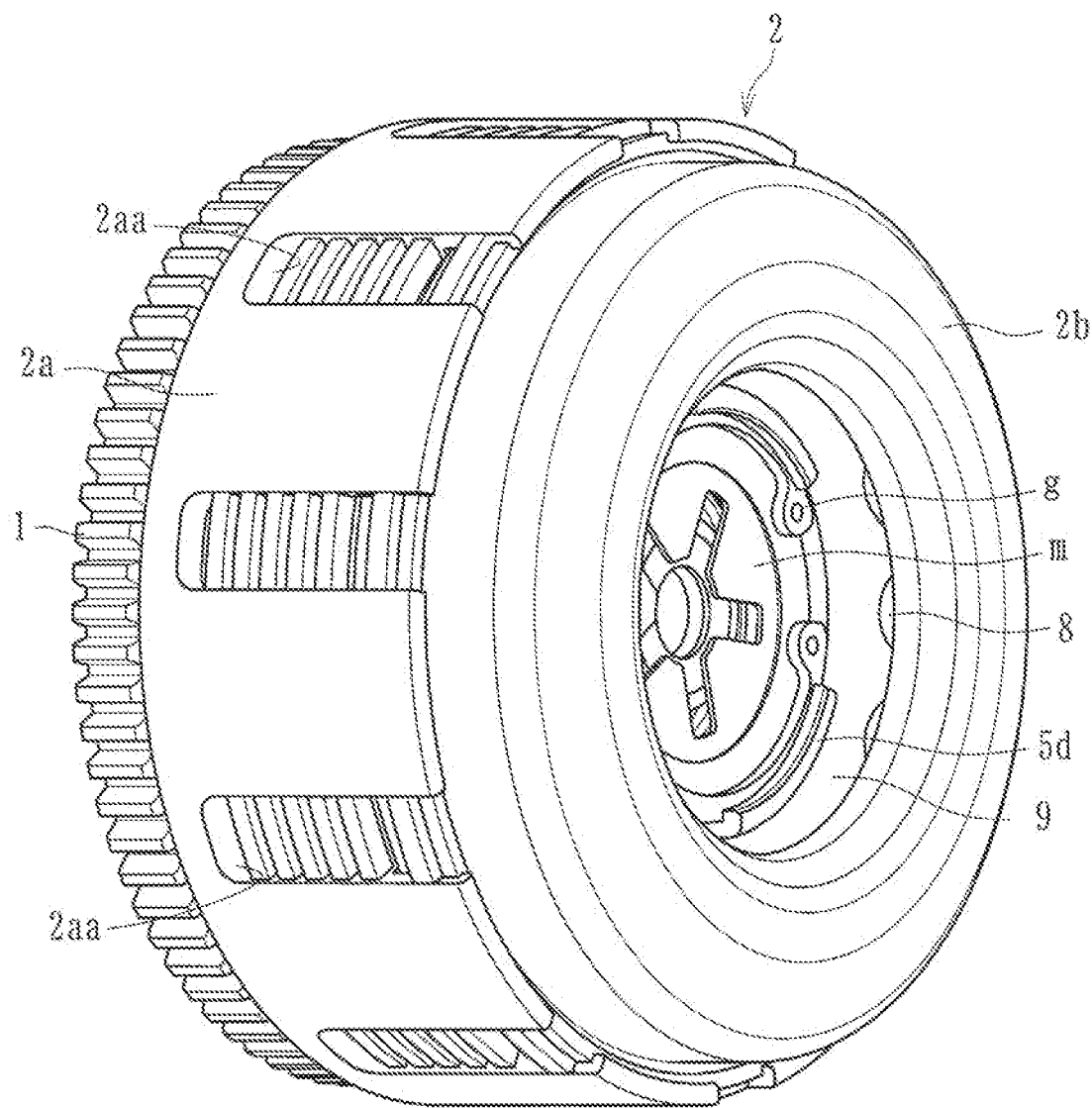

[Fig. 2]
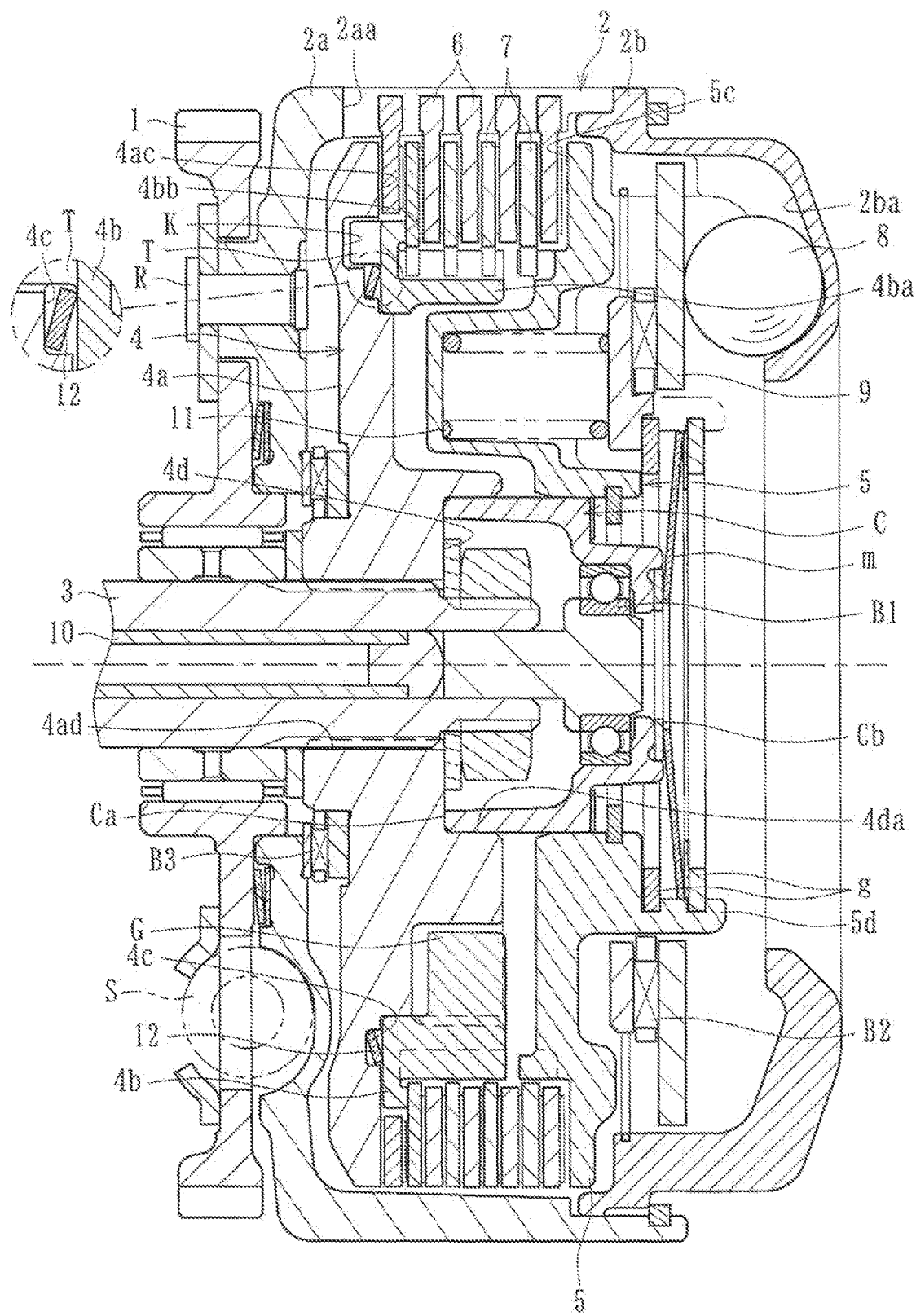

[Fig. 3]
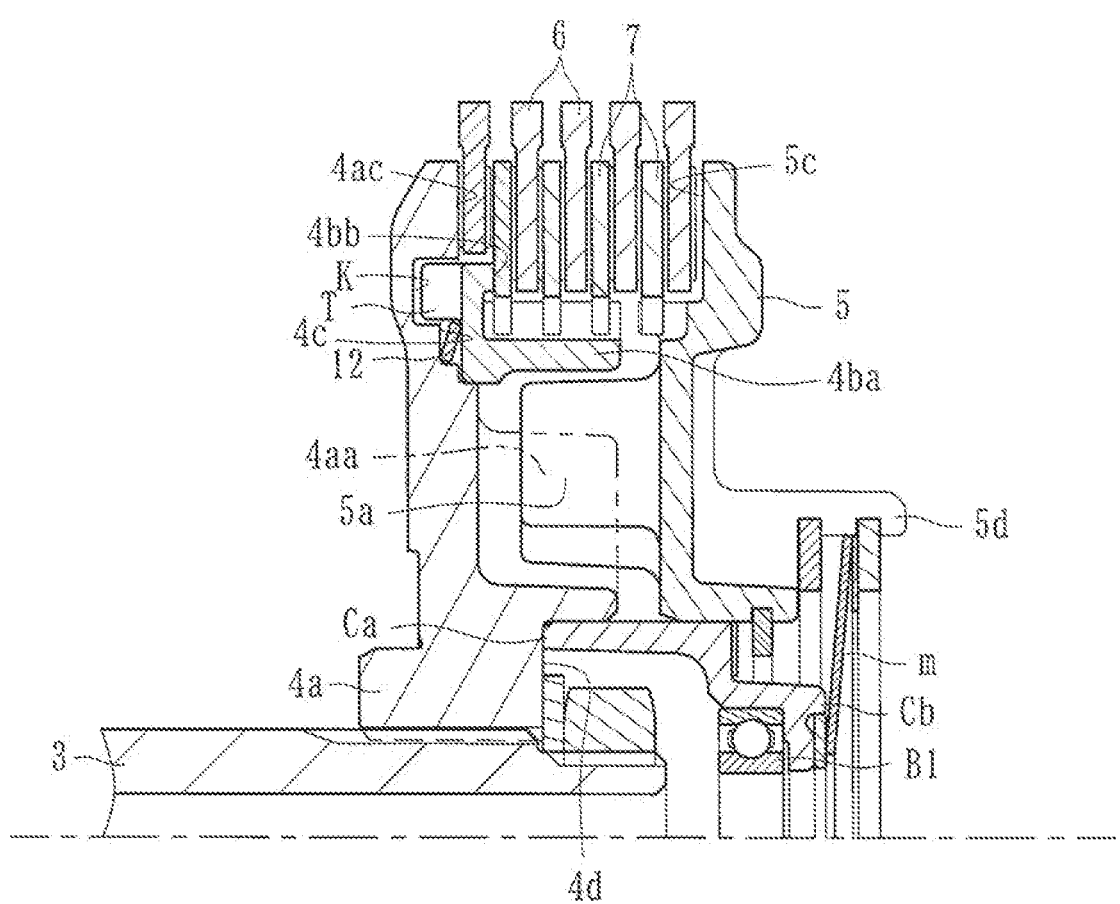

[Fig. 4]
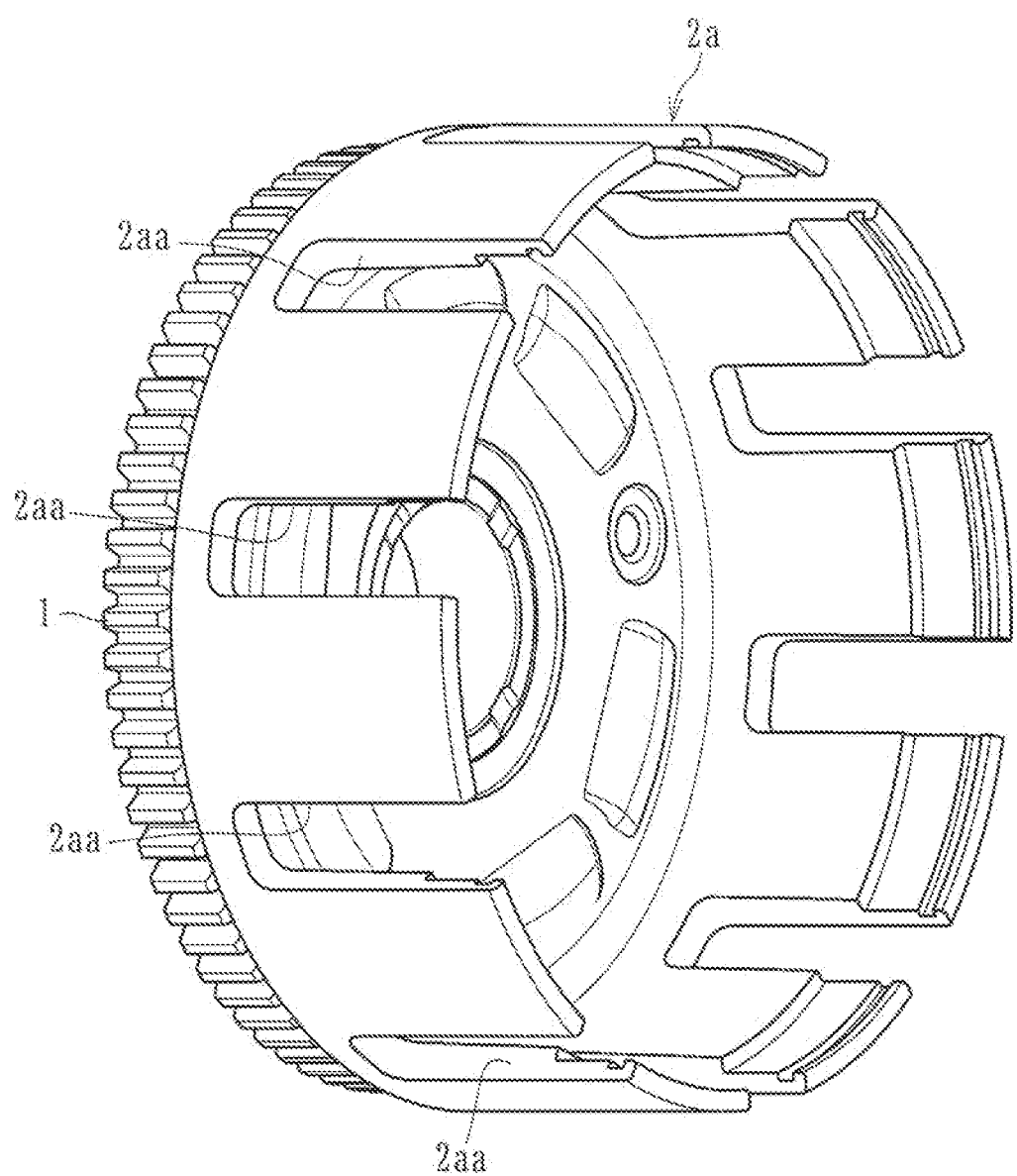

[Fig. 5]
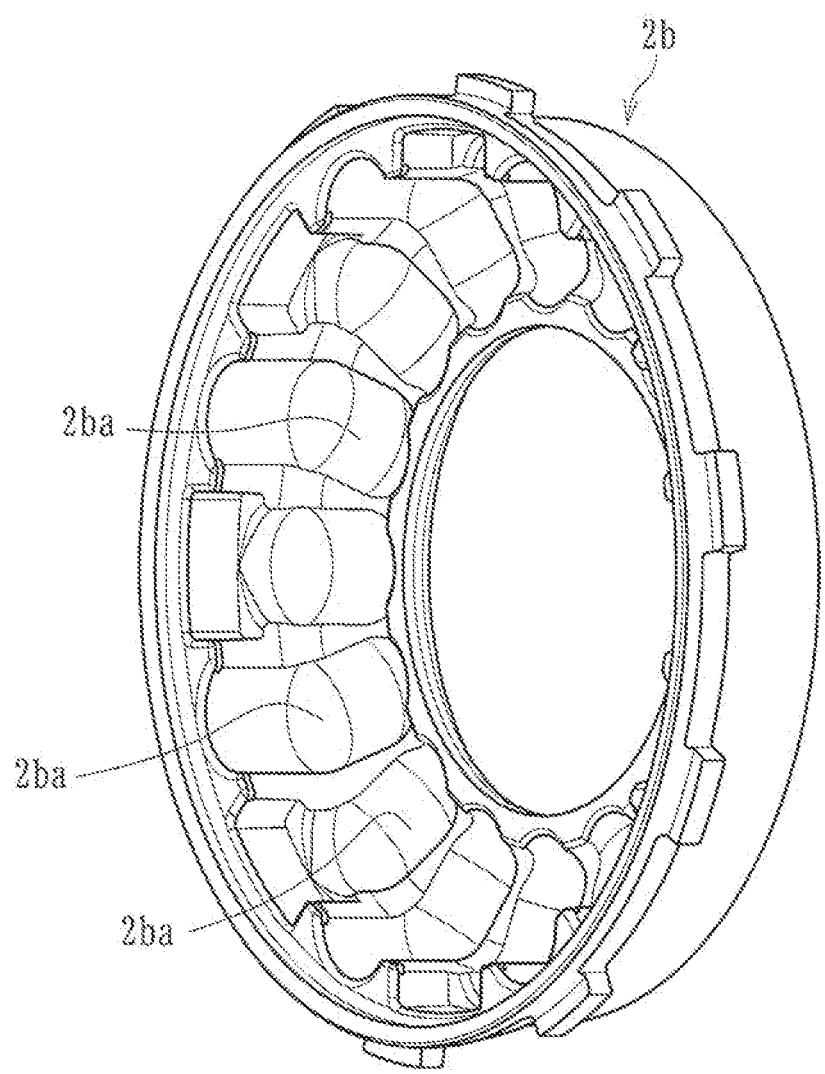

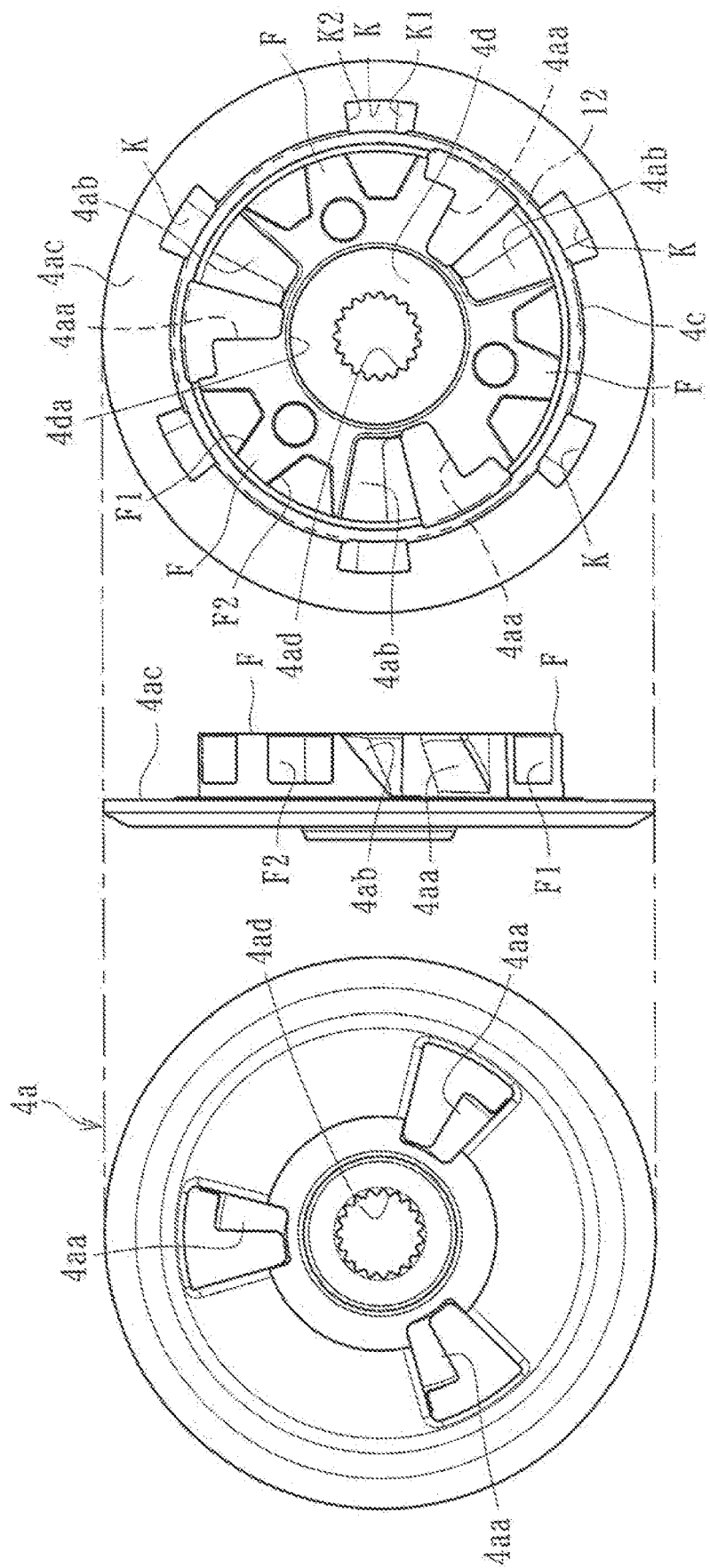
[Fig. 6]

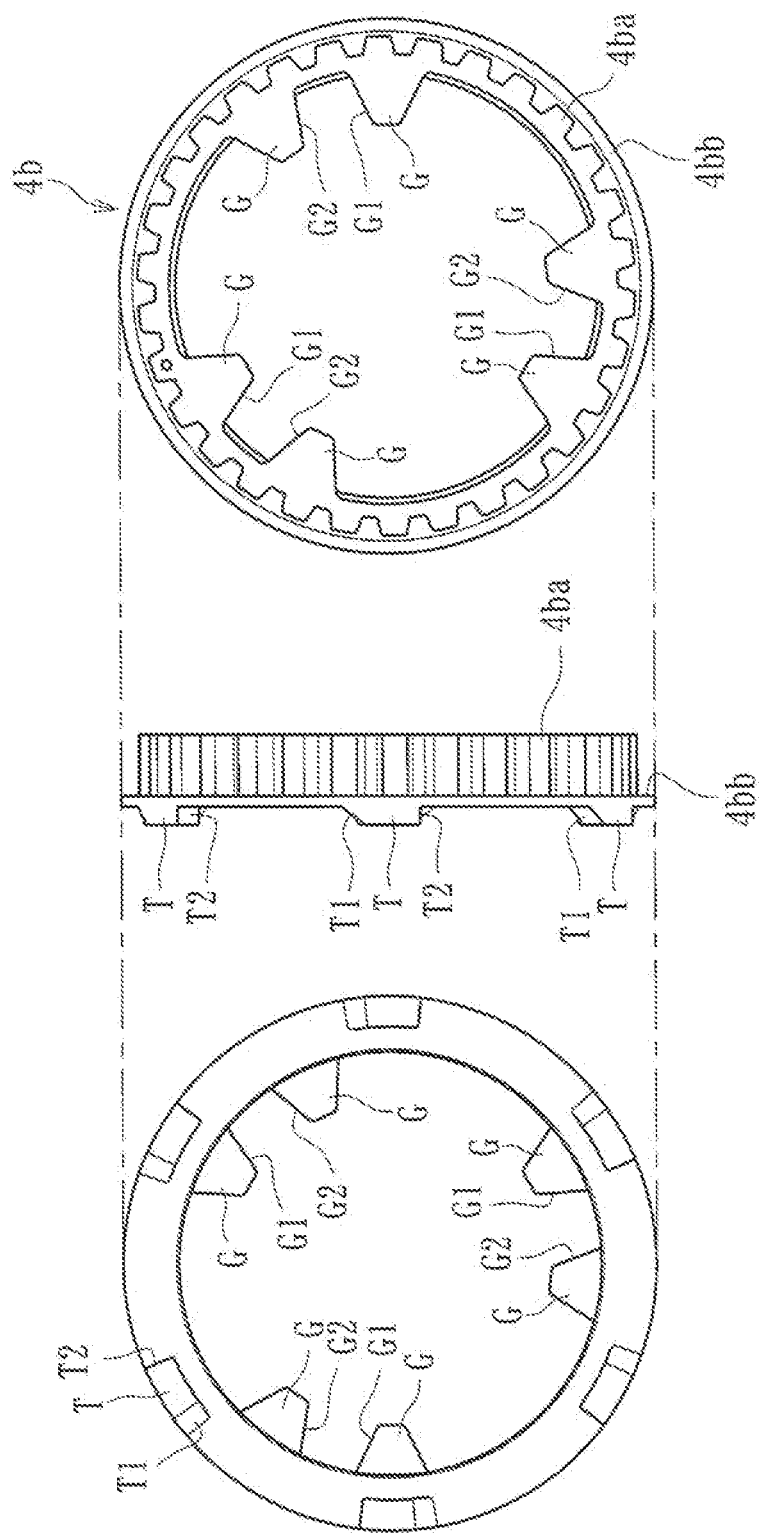

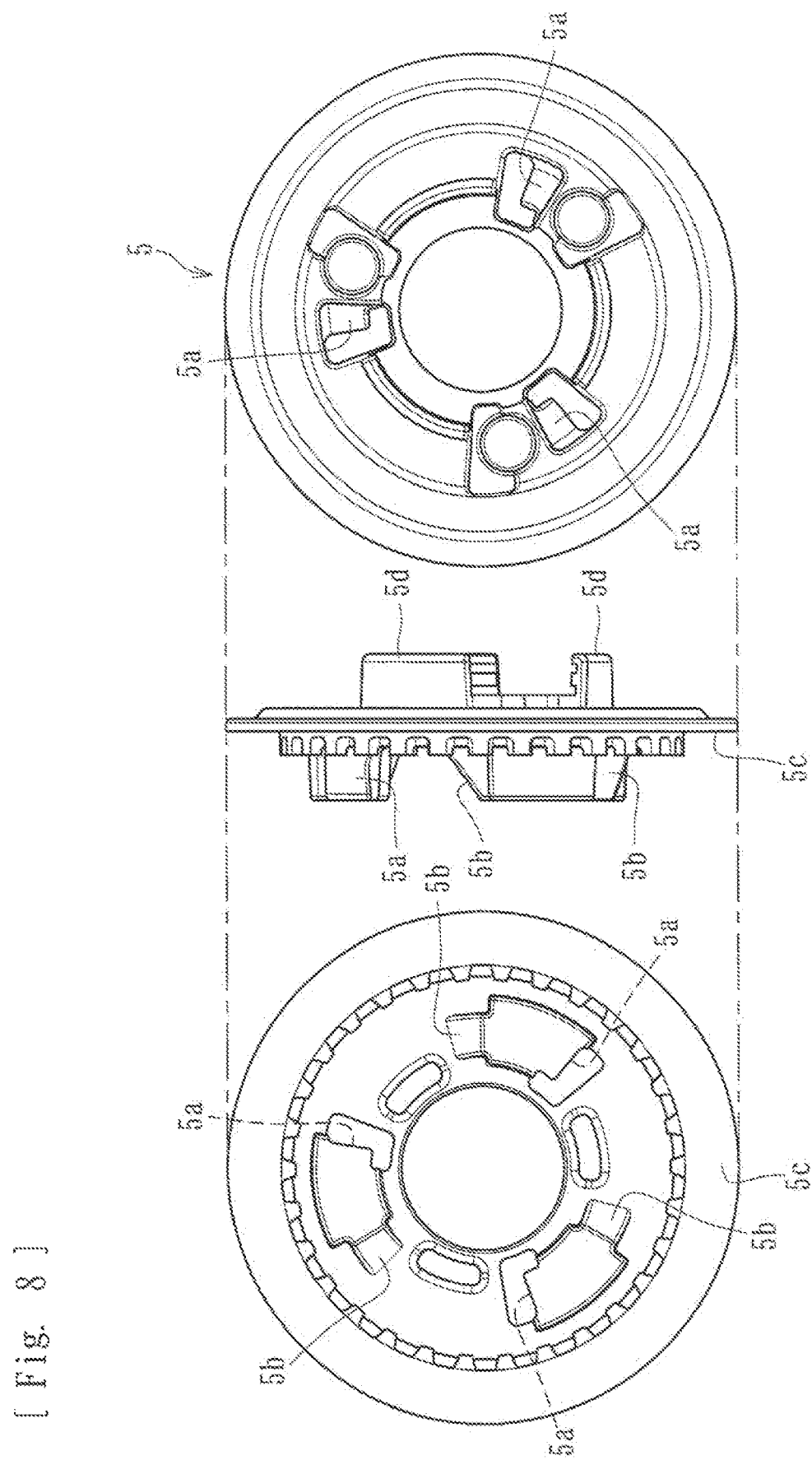
[Fig. 8]

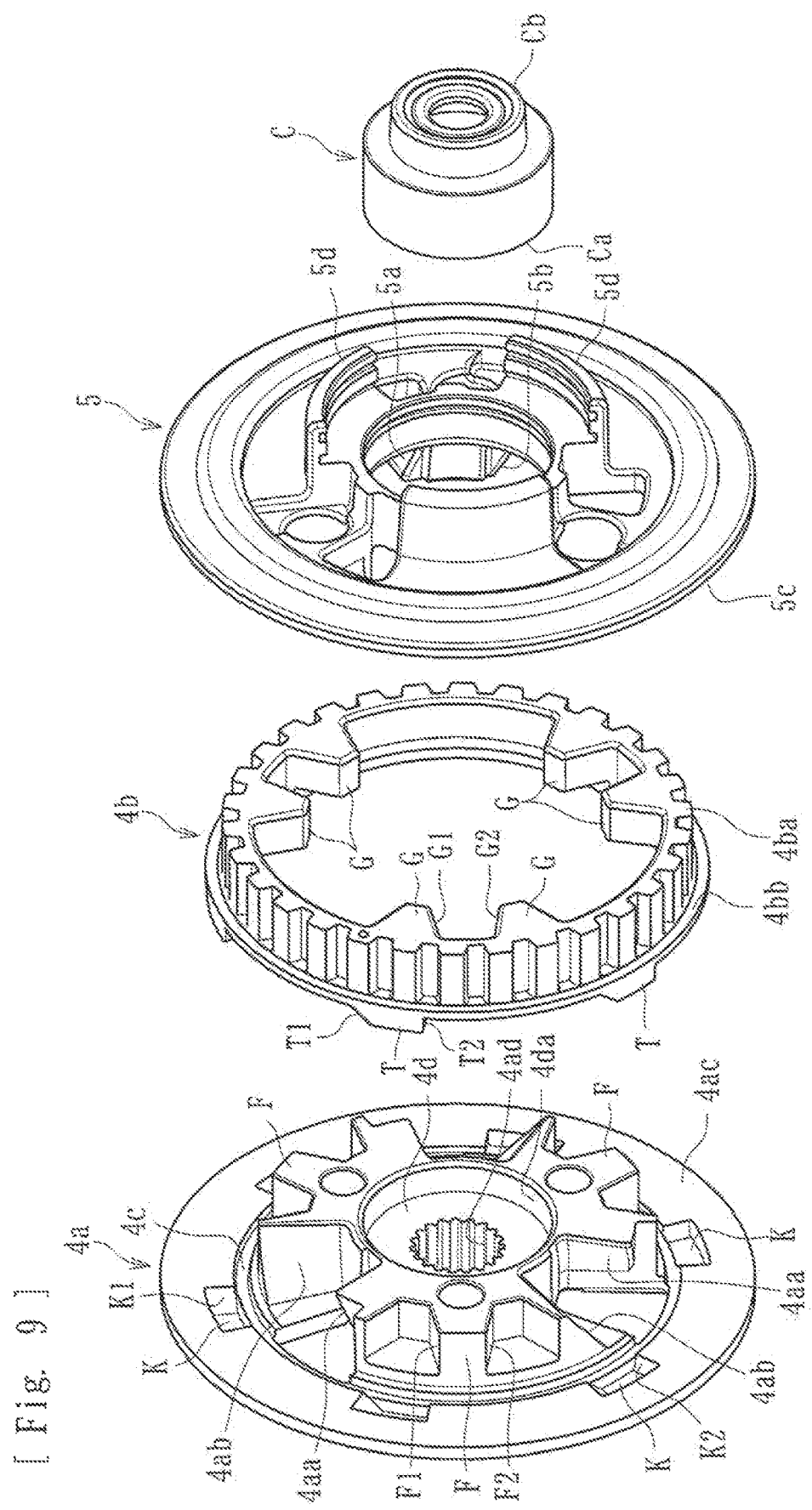

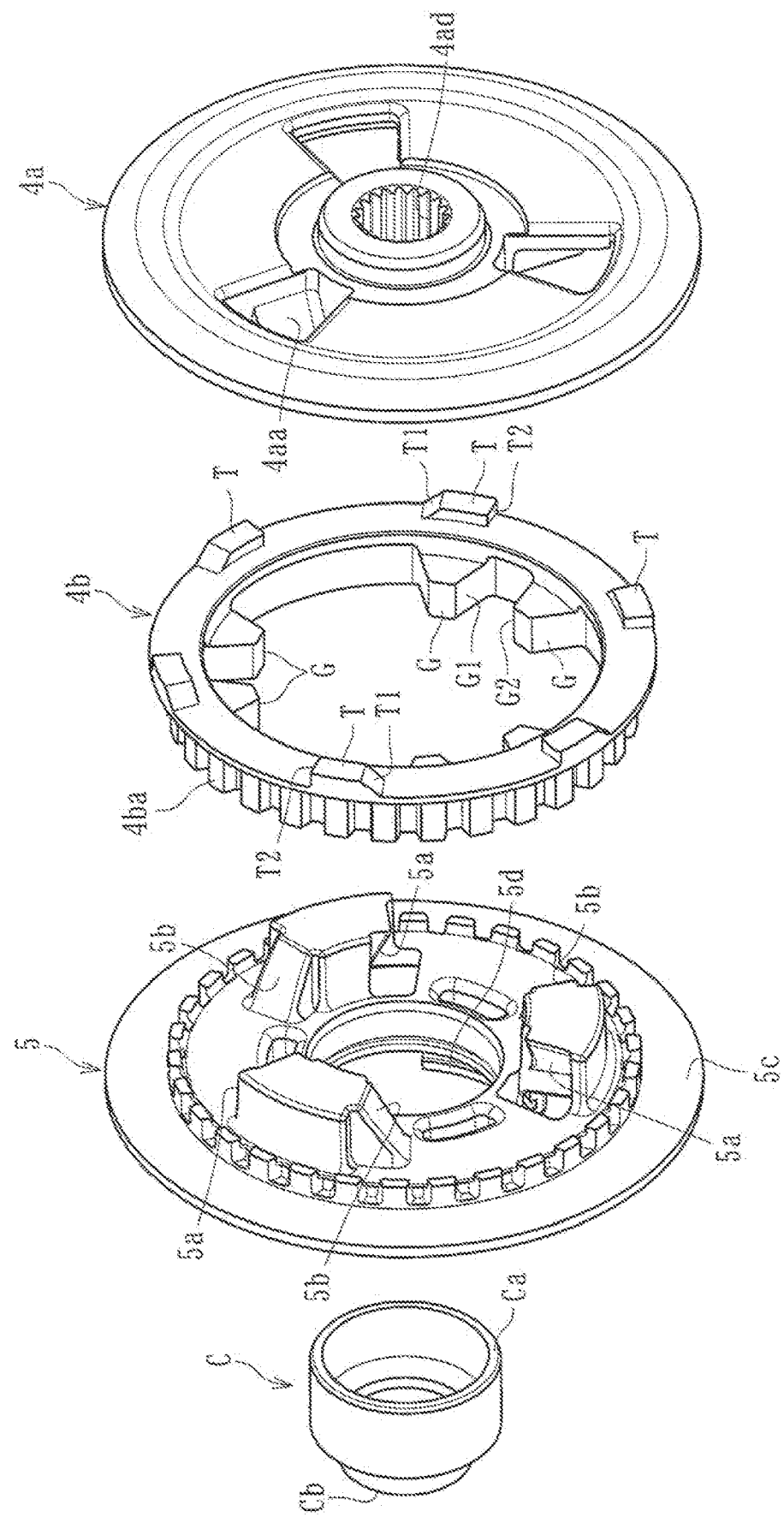

[Fig. 11]
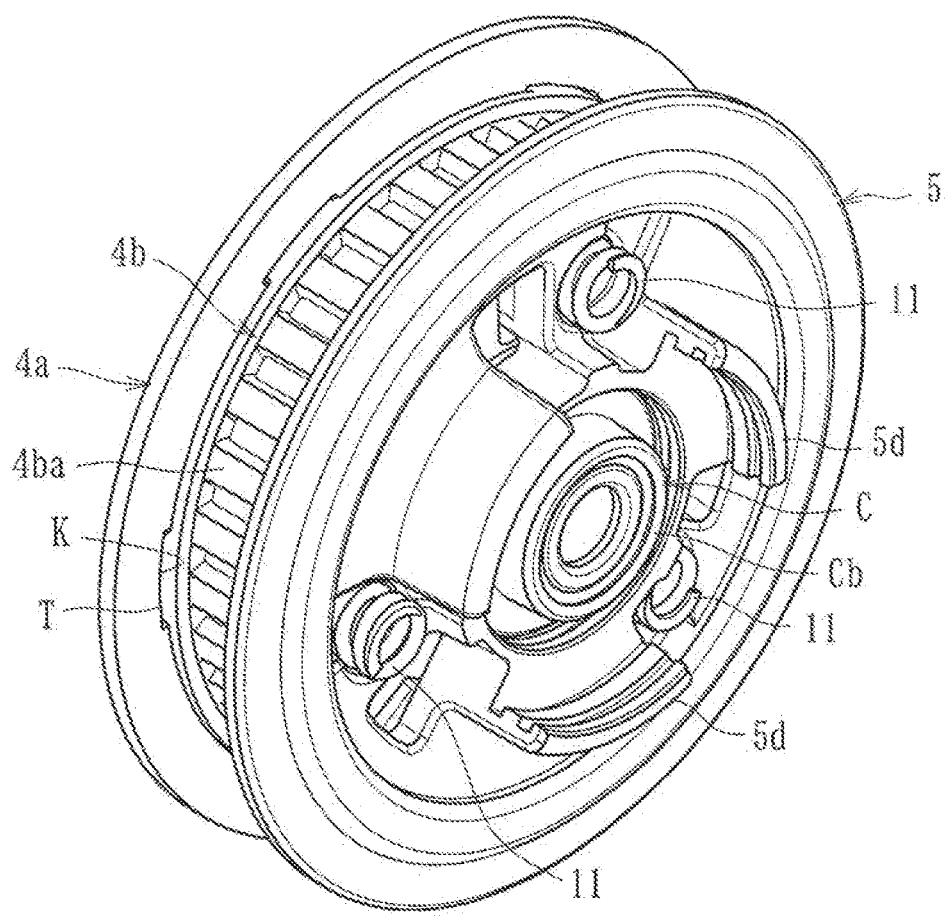
[Fig. 12]
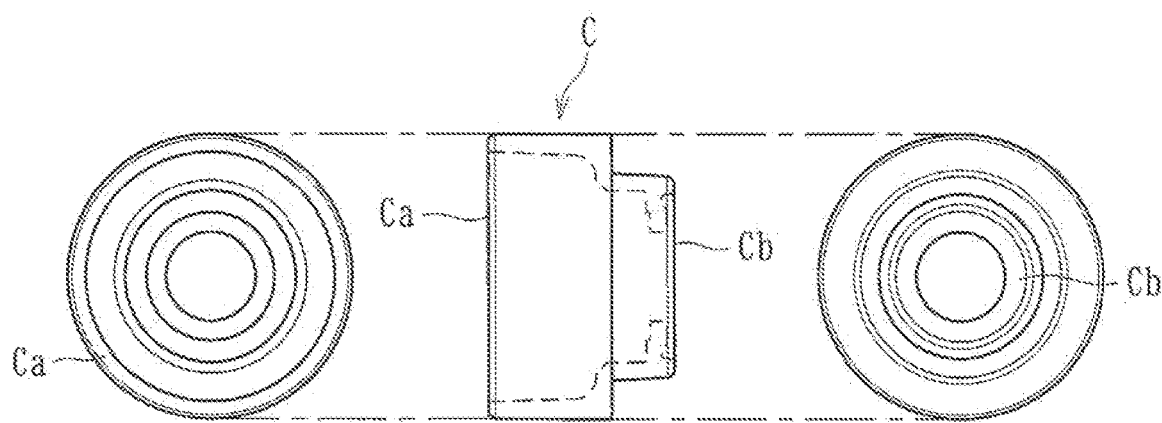

[Fig. 13]
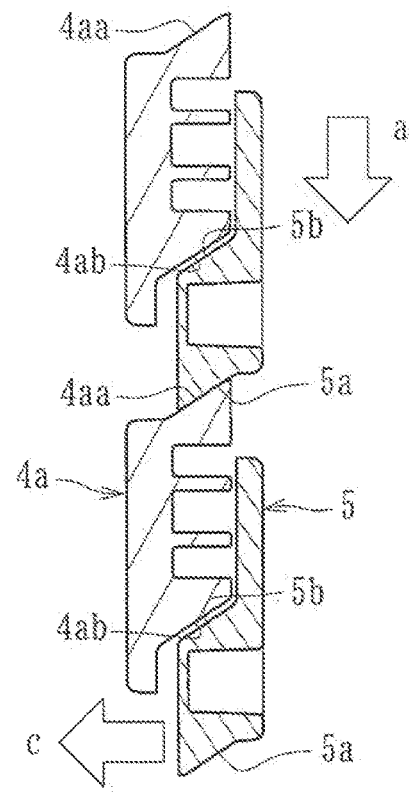
[Fig. 14]
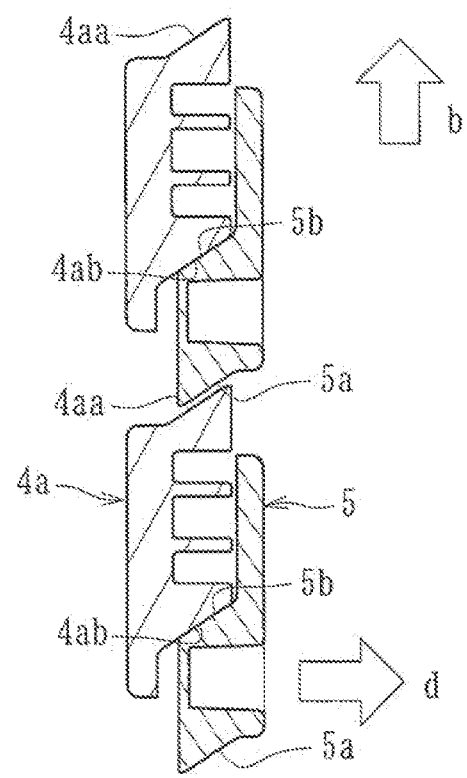

[Fig. 15]
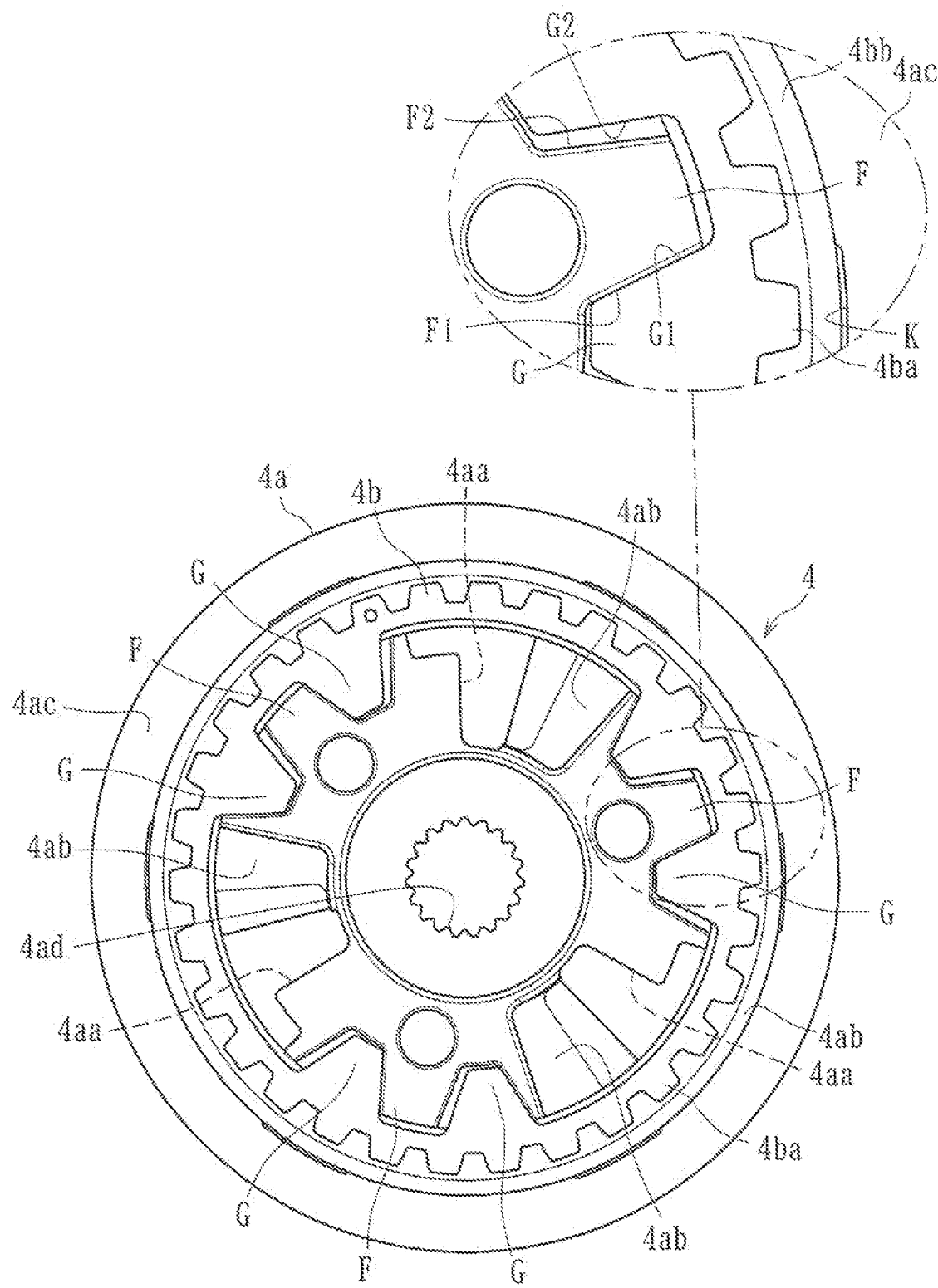

[Fig. 16]
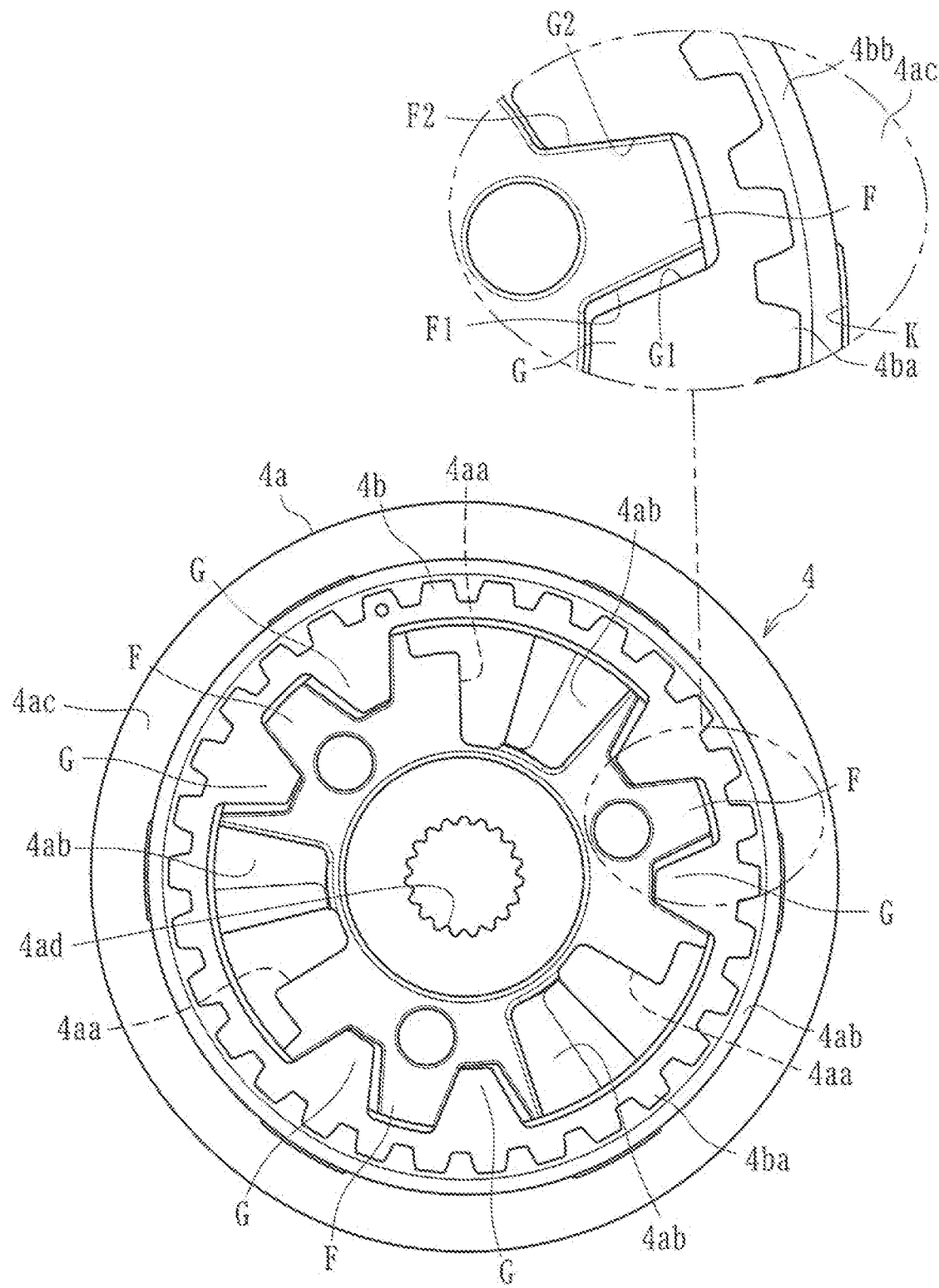

[Fig. 17]
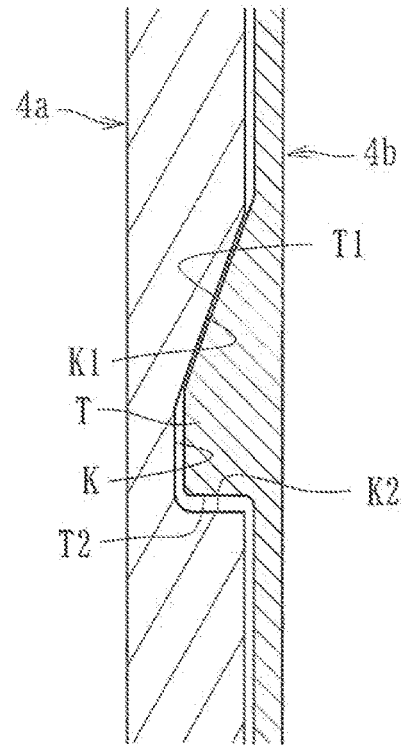
[Fig. 18]
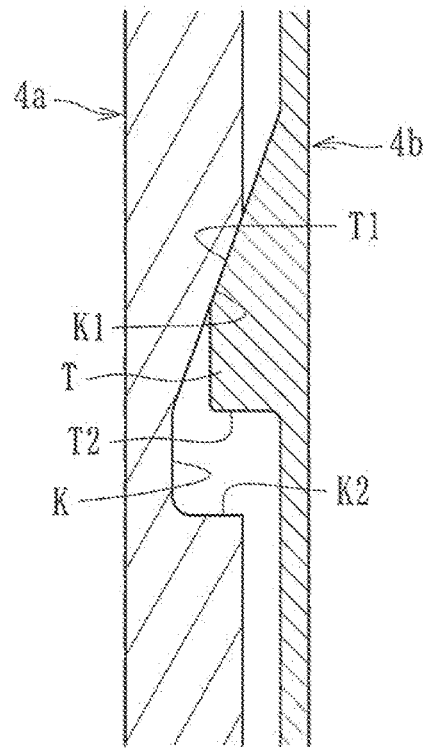

[Fig. 19]
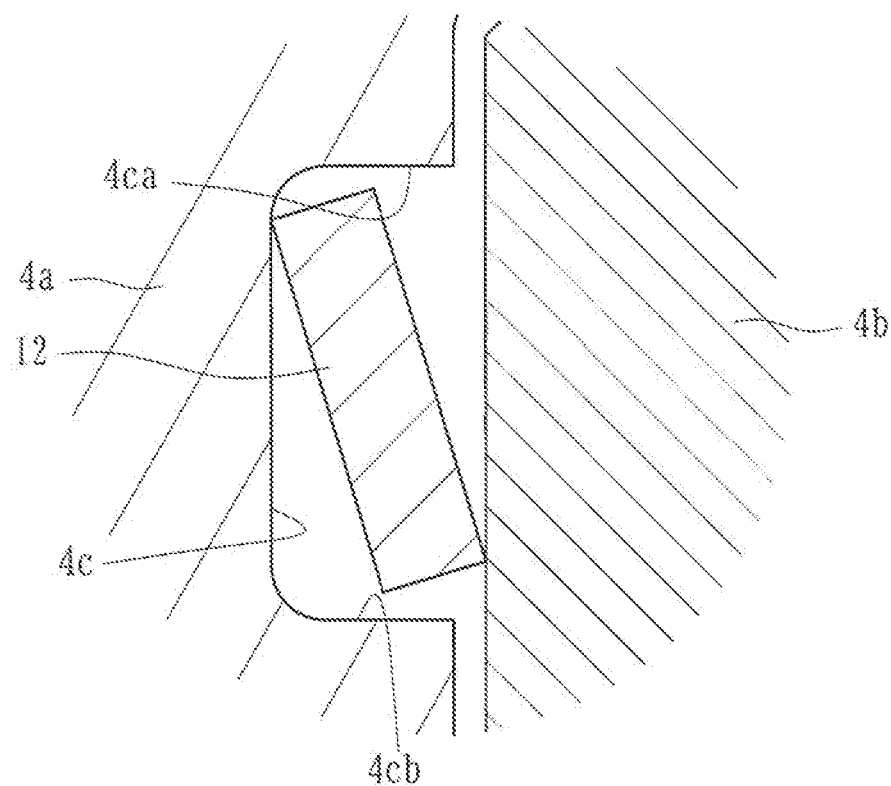

[Fig. 20]
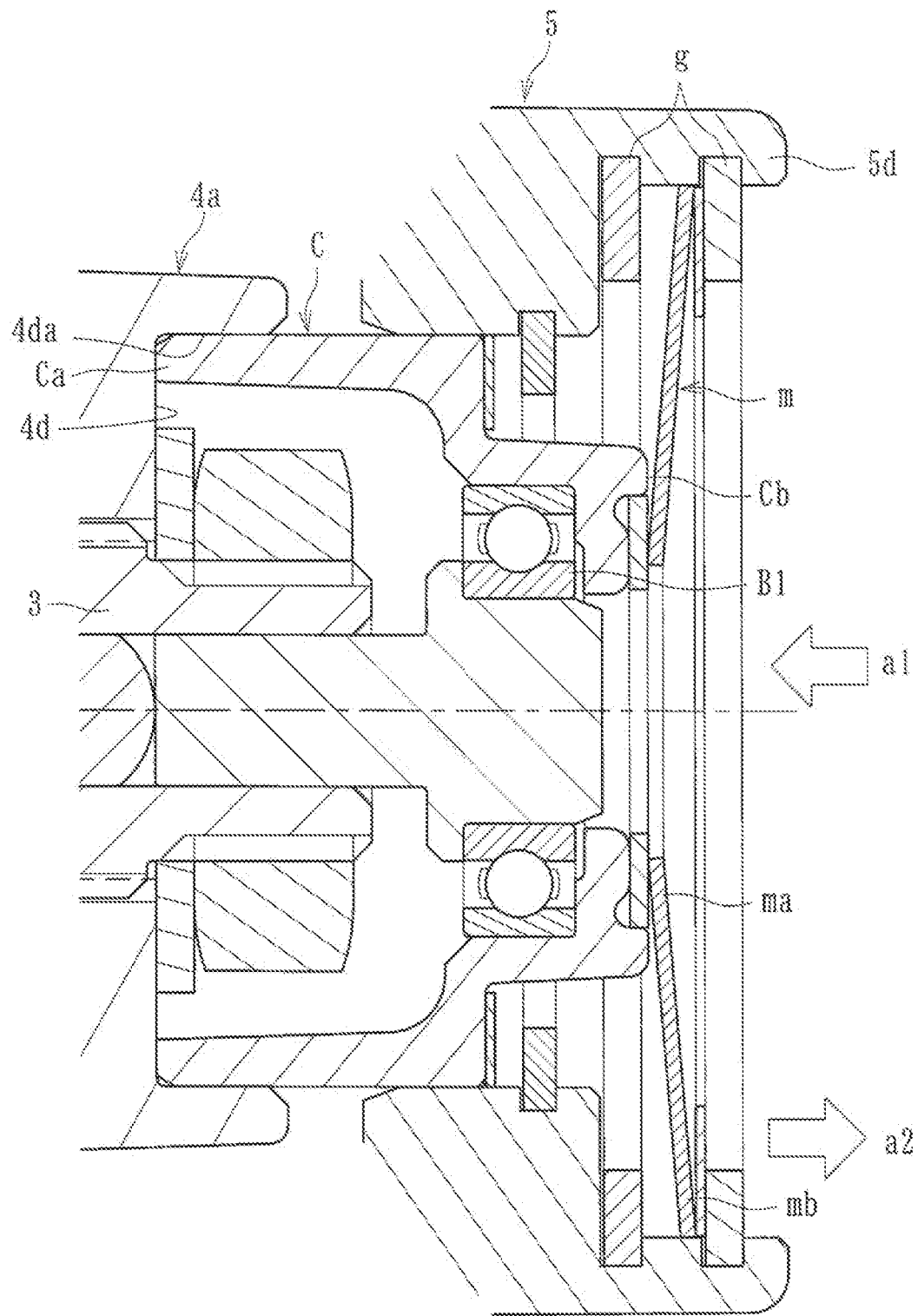

[Fig. 21]
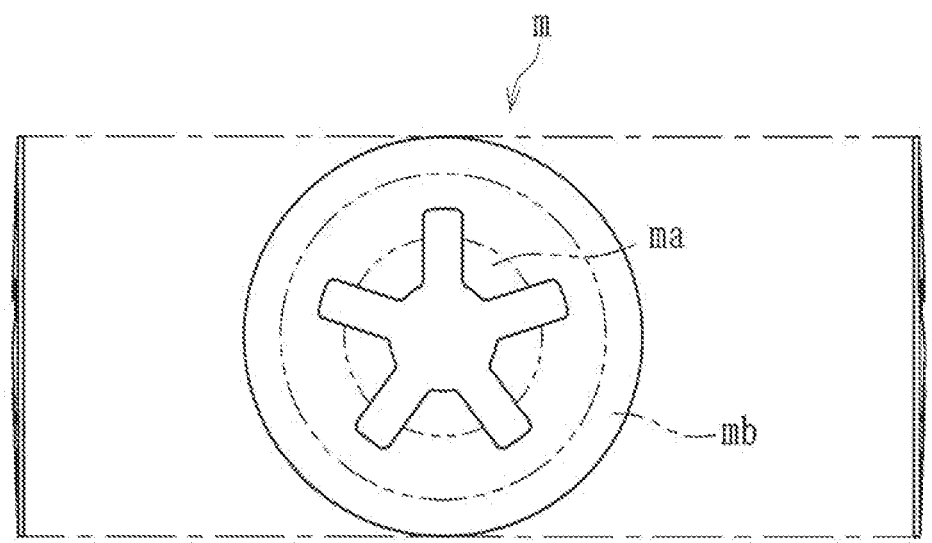

[Fig. 22]
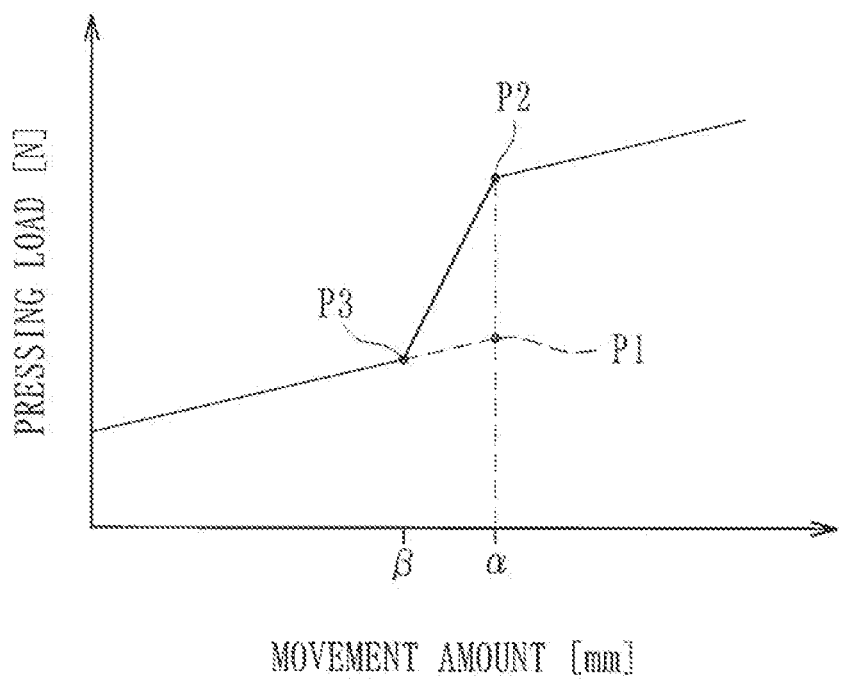
[Fig. 23]
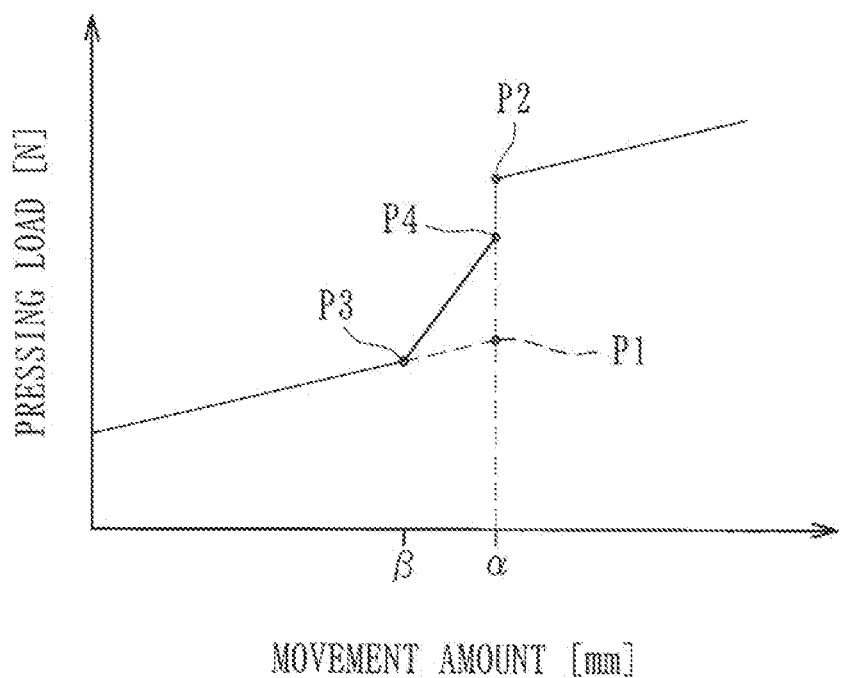

[Fig. 24]
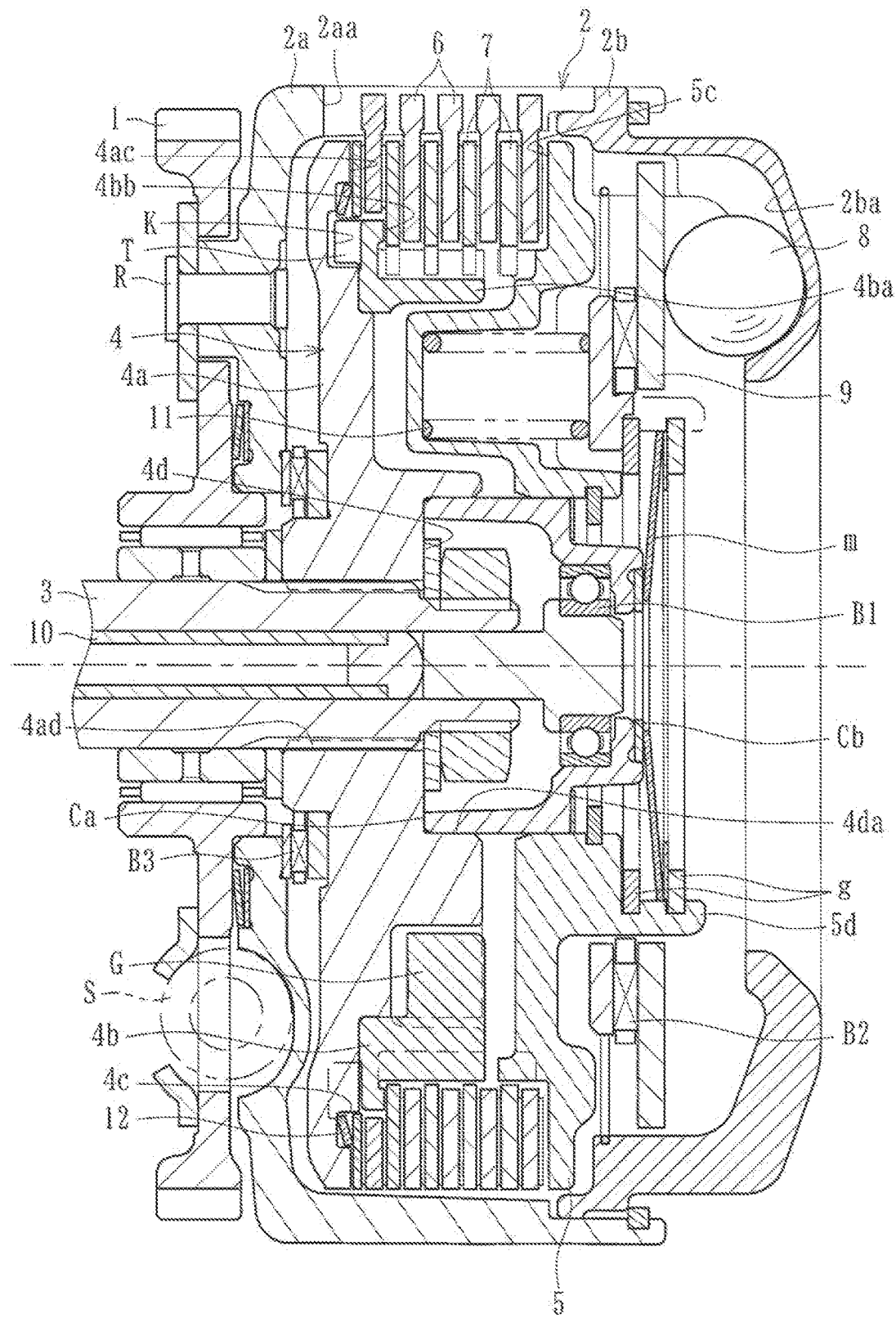

[Fig. 25]
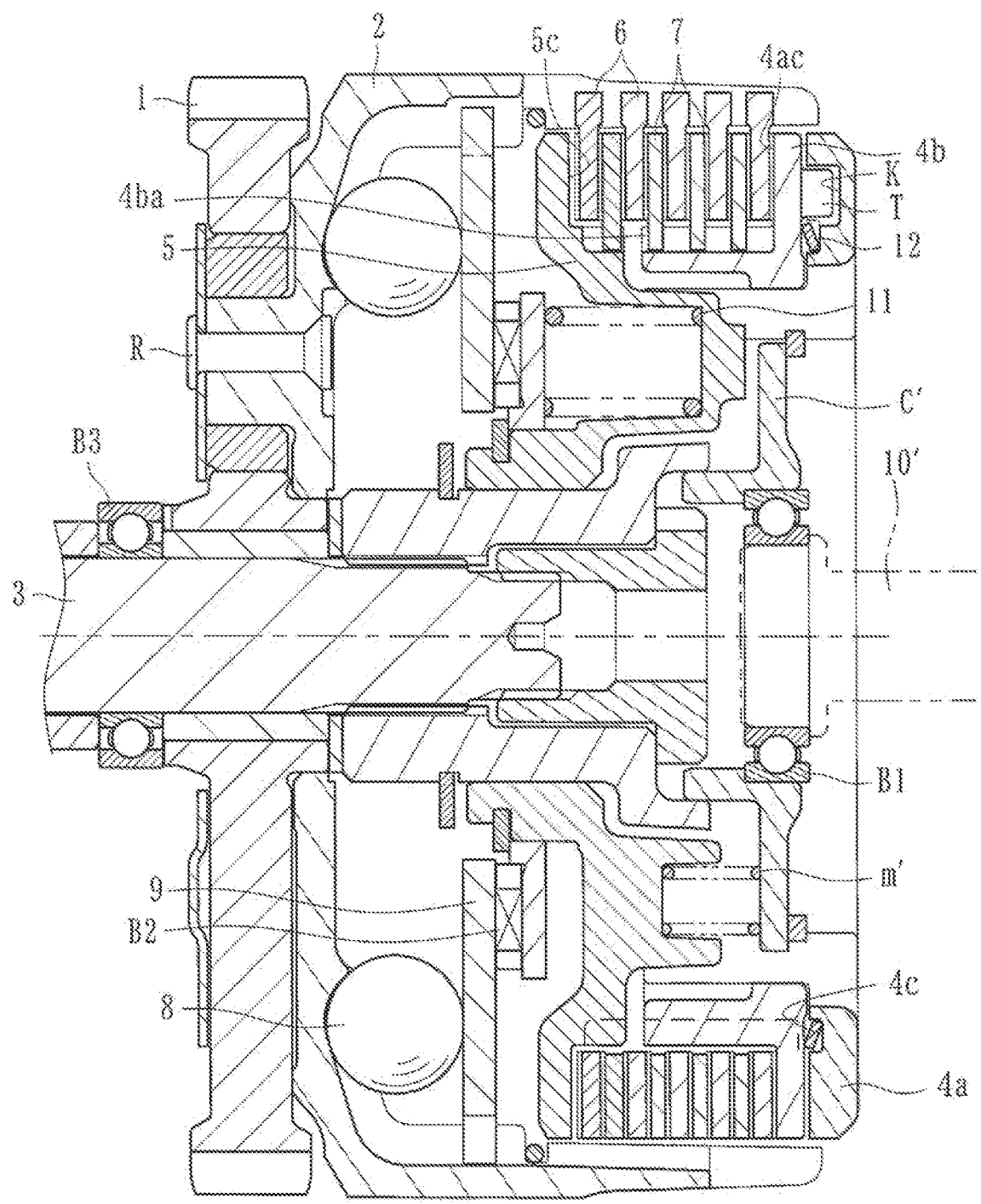

[Fig. 26]
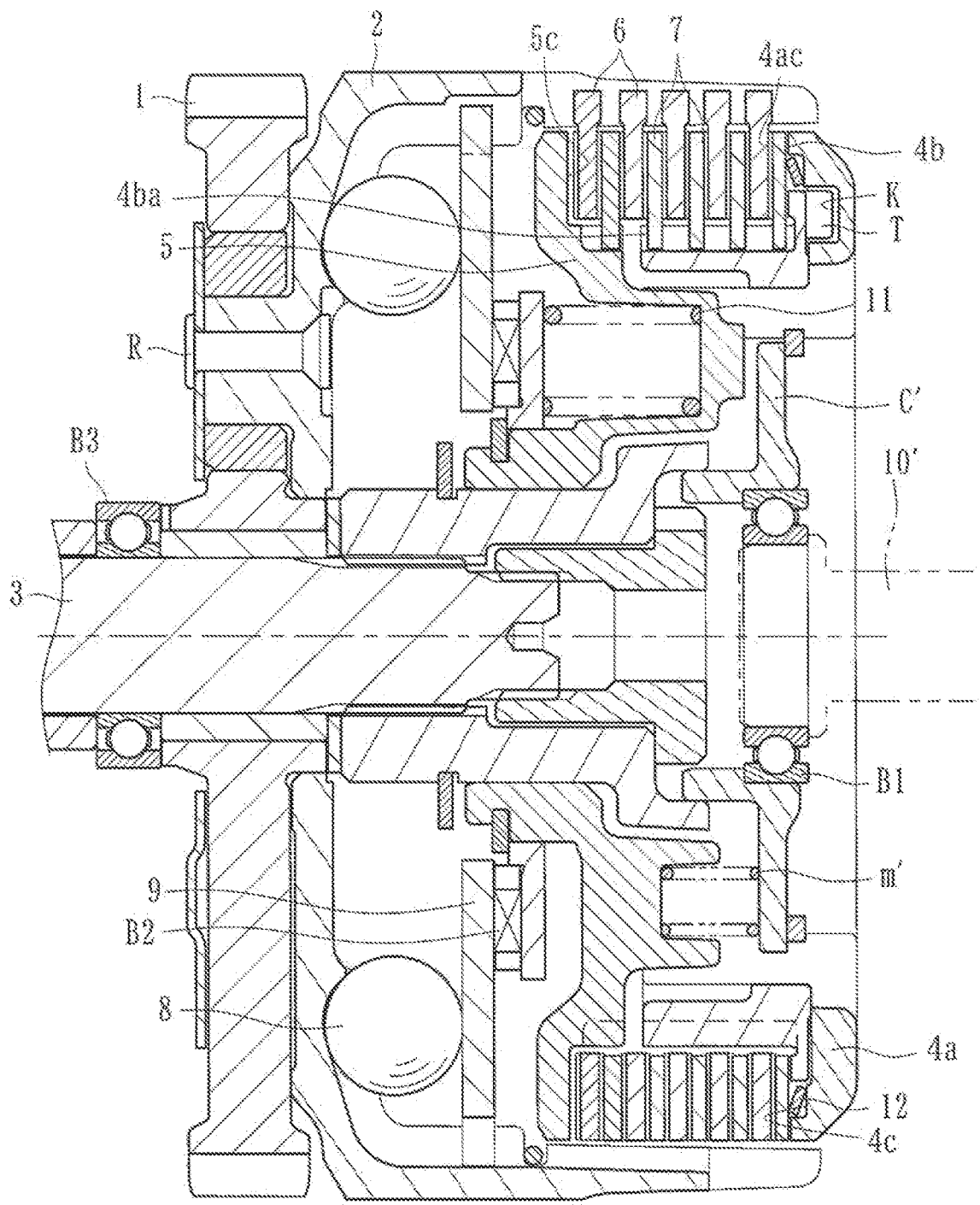

[Fig. 27]
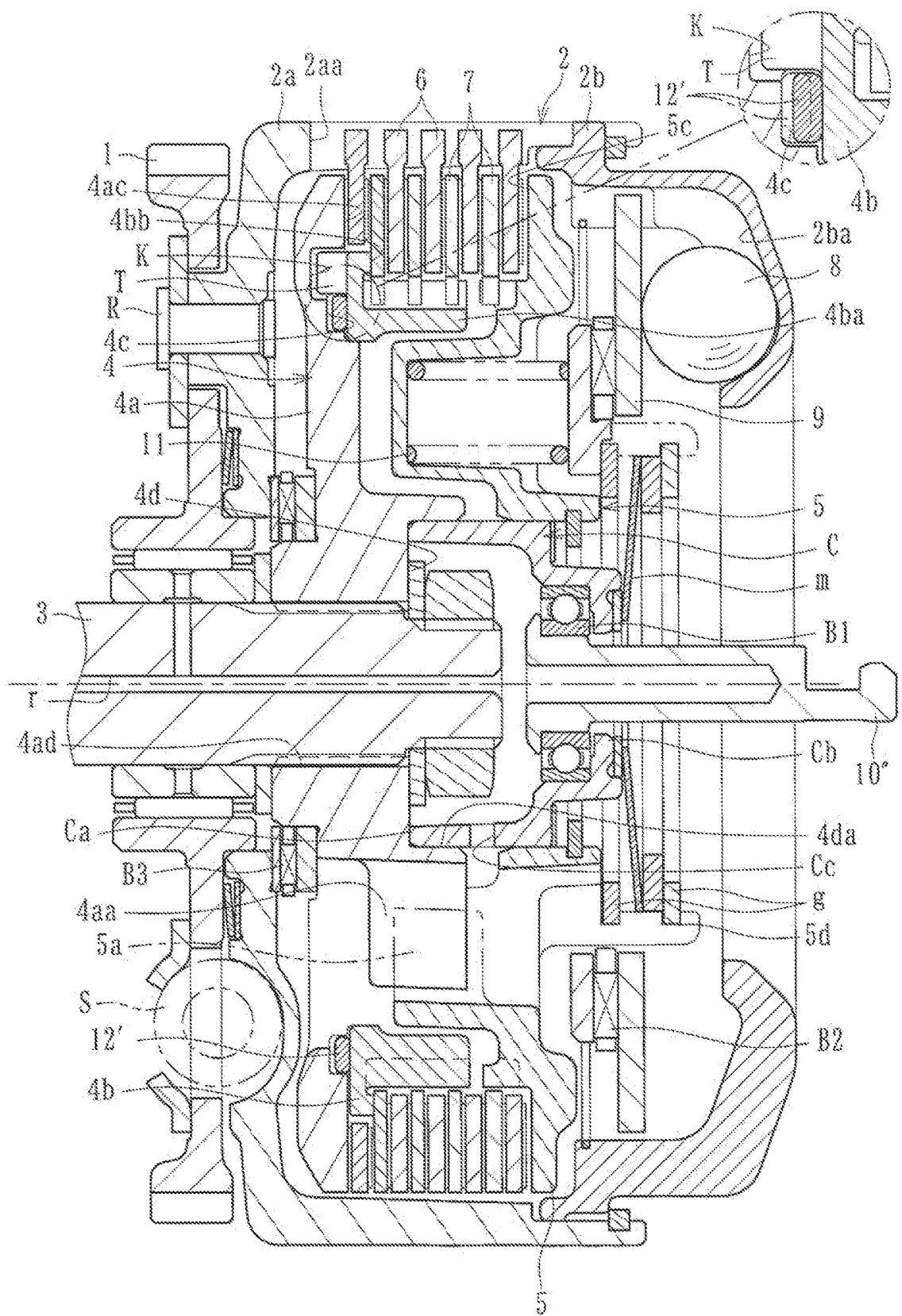

[Fig. 28]
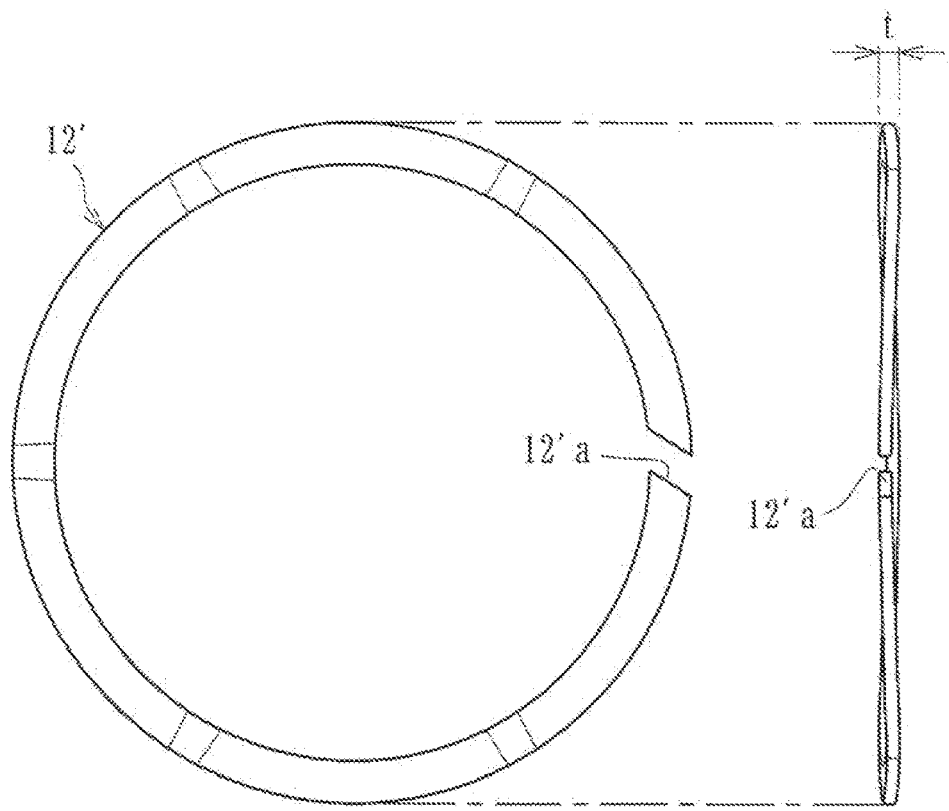
[Fig. 29]
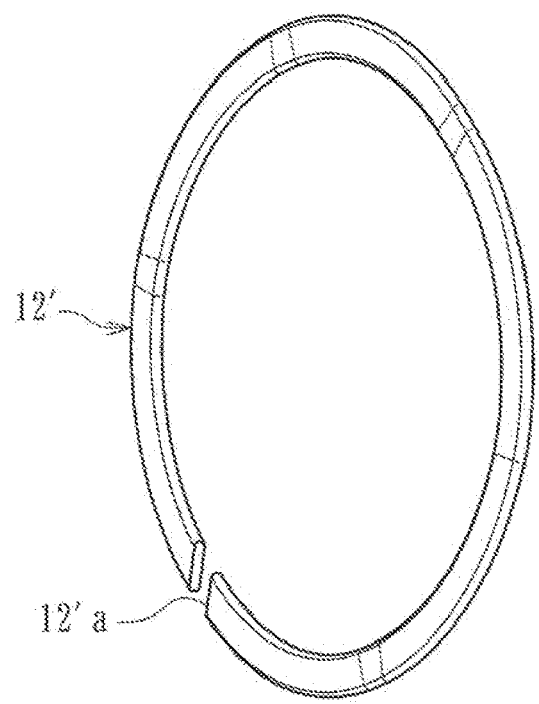

[Fig. 30]
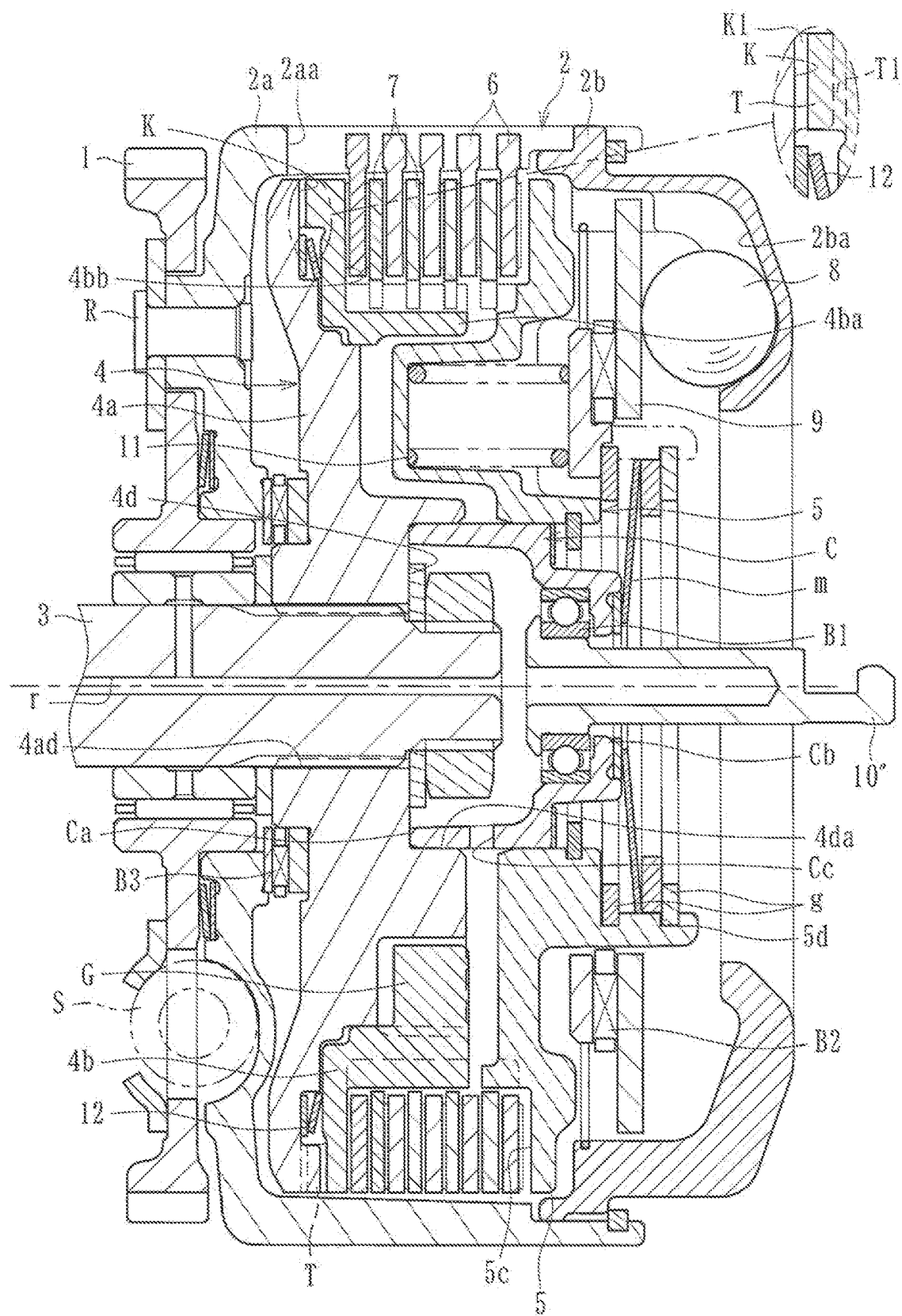

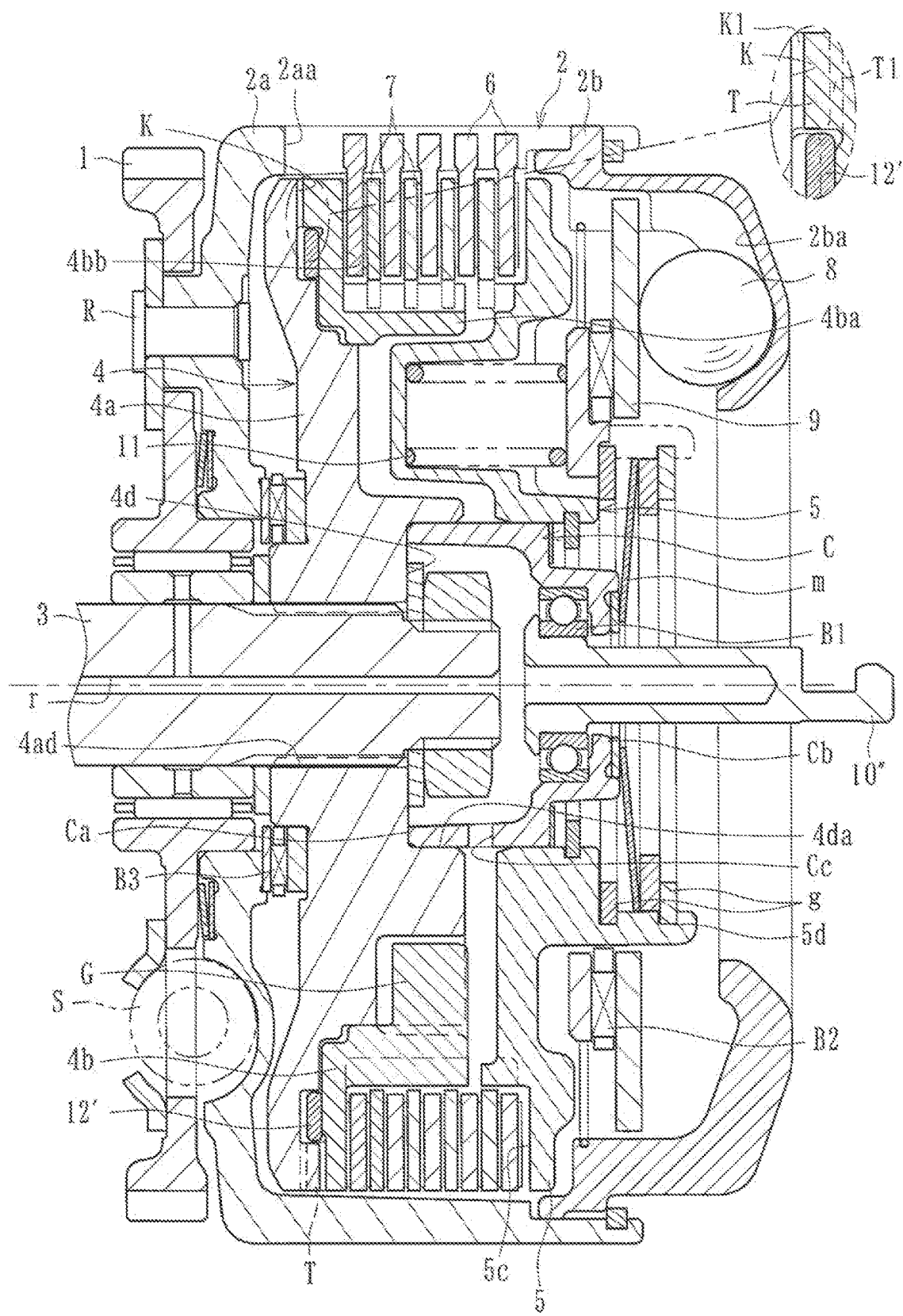
[Fig. 31]

[Fig. 32]
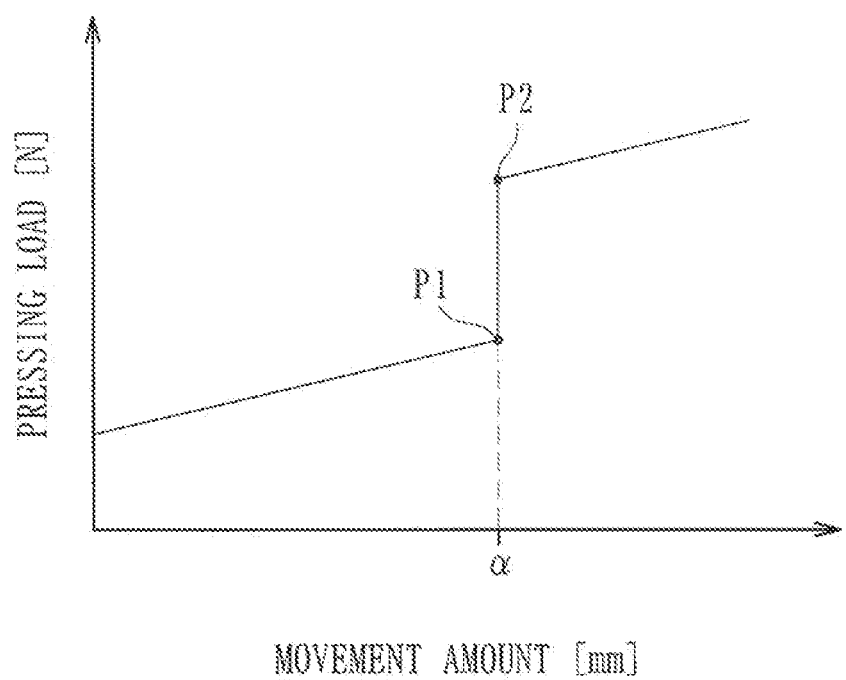

POWER TRANSMISSION DEVICE

CROSS-REFERENCE TO RELATED APPLICATIONS

This application is a continuation of U.S. patent application Ser. No. 17/336,387, filed Jun. 2, 2021, which is a continuation of International Application No. PCT/JP2019/047407, filed Dec. 4, 2019, which claims priority to Japanese Application No. 2018-227994, filed Dec. 5, 2018. The disclosures of the above applications are incorporating herein by reference.

FIELD

The present disclosure relates to a power transmission device that can appropriately transmit or stop transmitting rotational power of an input member to an output member.

BACKGROUND

In general, a motorcycle has a power transmission device that is used to appropriately transmit or stop transmitting the engine driving power to a transmission and a driving wheel. The power transmission device includes an input member, coupled to the engine side, an output member, coupled to the transmission and driving wheel side, a clutch member, coupled to an output member, and a pressure member. The pressure member moves toward or away from the clutch member. The power transmission device is configured to transmit power by moving the pressure member toward the clutch member to press a drive-side clutch plate and a driven-side clutch plate against each other. Also, it is configured to stop transmitting the power by moving the pressure member away from the clutch member to release a press-contact force between the drive-side clutch plate and the driven-side clutch plate.

Among existing power transmission devices, as disclosed in, for example, Japanese Unexamined Patent Application Publication No. 2017-155884, a power transmission device includes a weight member. The weight member can press a drive-side clutch plate and a driven-side clutch plate against each other by moving from a radially-inner position to a radially-outer position in a groove portion due to a centrifugal force generated by rotation of the clutch housing. With the existing power transmission device, because the clutch housing rotates as the engine is driven, it is possible to apply a centrifugal force to the weight member and to transmit the driving power of the engine to a wheel by pressing the drive-side clutch plate and the driven-side clutch plate against each other.

The existing power transmission device further includes: a release spring that is compressed as an interlocking member moves and the pressure member moves from an inactive position toward an active position. The spring can apply an urging force while allowing movements of the interlocking member and the pressure member until the drive-side clutch plate and the driven-side clutch plate reach an engaged state before being pressed against each other. A clutch spring, that is compressed, in a process where the interlocking member moves after the drive-side clutch plate and the driven-side clutch plate have reached the engaged state and apply a press-contact force between the drive-side clutch plate and the driven-side clutch plate while allowing movement of the interlocking member.

SUMMARY

However, the existing power transmission device has the following problem.

If the difference between a load (maximum load), at the time when compression of the release spring has been finished (see P1 in FIG. 32), and a load (set load), at the time when compression of the clutch spring is started (see P2 in the figure), is large, in a process where the interlocking member moves and the pressure member moves from the inactive position toward the active position as the rotational speed of the engine increases, a dead zone where the movement of the interlocking member stops (stops while remaining at the movement amount a in the figure) occurs after compression of the release spring has been finished and before compression of the clutch spring is started.

Then, when the rotational speed of the engine increases further and the pressing load applied to the interlocking member reaches the set load of the clutch spring (at the time of P2 in the figure), compression of the clutch spring is started. Thus, the interlocking member starts moving again, and the dead zone is passed through. However, because the clutch plates are pressed against each other and the power is transmitted after the dead zone has been passed through, a feeling of a surprise occurs when power is transmitted and operability may be affected.

The present applicant has examined a power transmission device where a clutch member is divided into two parts so that an engine brake can be applied satisfactorily. The power transmission device includes a first clutch member, coupled to an output member, a second clutch member attached to a driven-side clutch plate, and a back-torque transmitting cam. The back-torque transmitting cam presses a drive-side clutch plate and the driven-side clutch plate against each other by moving the second clutch member when a rotational force is input to the first clutch member, via the output member. In disposing means for suppressing the feeling of surprise, the present applicant has eagerly examined effective utilization of a space that is obtained by the arrangement of the first clutch member and the second clutch member.

The present disclosure has been made in consideration of such circumstances. It is an object to provide a power transmission device that can suppress a feeling of surprise when power is transmitted and improve operability while efficiently utilizing a space that is obtained by the arrangement of a first clutch member and a second clutch member.

According to a disclosure, a power transmission device comprises a clutch housing that rotates together with an input member rotated by vehicle engine driving power. A plurality of drive-side clutch plates are attached to the clutch housing. A clutch member includes a plurality of driven-side clutch plates that are alternately formed with the drive-side clutch plates of the clutch housing. The clutch member is coupled to an output member of rotating a wheel of the vehicle. A pressure member is movable between an active position and an inactive position. In the active position, the pressure member presses the drive-side clutch plates and the driven-side clutch plates against each other to transmit the engine driving power to the wheel. In the inactive position, the pressure member releases a press-contact force between the drive-side clutch plates and the driven-side clutch plates to stop transmission of the engine driving power to the wheel. A weight member is disposed in a groove portion extending in a radial direction of the clutch housing. The weight member is movable from a radially-inner position to a radially-outer position in the groove portion due to a centrifugal force generated by rotation clutch housing. An interlocking member moves the pressure member from the inactive position to the active position as the weight member moves from the radially-inner position to the radially-outer position. A release spring holds the pressure member at the inactive position. The spring is compressed as the interlocking member moves and the pressure member moves from the inactive position toward the active position. The release spring applies an urging force while allowing movements of the interlocking member and the pressure member until the drive-side clutch plates and the driven-side clutch plates reach an engaged state before the drive-side clutch plates and the driven-side clutch plates are pressed against each other. A clutch spring is compressed in a process where the interlocking member moves after the drive-side clutch plates and driven-side clutch plates have reached the engaged state. The clutch spring applies a press-contact force between the drive-side clutch plates and the driven-side clutch plates while allowing movement of the interlocking member. The clutch member includes a first clutch member, coupled to the output member, a second clutch member, attached to the driven-side clutch plates, a back-torque transmitting cam and a cushioning member. The back-torque transmitting cam presses the drive-side clutch plates and the driven-side clutch plates against each other by moving the second clutch member when a rotational force is input to the first clutch member, via the output member. The cushioning member, by being compressed, interposed between the first clutch member and the second clutch member, applies an urging force while allowing movements of the interlocking member and the pressure member in a process where the interlocking member moves and the pressure member moves from the inactive position toward the active position.

According to the disclosure, the cushioning member includes a spring that is set to a load such that the spring is compressed before the clutch spring starts to be compressed.

According to the disclosure, the cushioning member is accommodated in an accommodation recessed portion that is formed in a surface where the first clutch member and the second clutch member face each other.

According to the disclosure, the accommodation recessed portion includes an annular groove. The cushioning member includes a spring with an annular shape conformed to a shape of the groove.

According to the disclosure, the back-torque transmitting cam is formed in a plurality of annular shapes in the surface where the first clutch member and the second clutch member face each other. The accommodation recessed portion is formed in a concentric circular shape at a position that is adjacent to the back-torque transmitting cam.

According to the disclosure, it is possible to suppress a feeling of surprise when power is transmitted and to improve operability while efficiently utilizing a space that is obtained by the arrangement of the first clutch member and the second clutch member. The power transmission device includes the cushioning member interposed between the first clutch member and the second clutch member. Thus, the cushioning member applies an urging force, while allowing movements of the interlocking member and the pressure member, by being compressed in a process where the interlocking member moves and the pressure member moves from the inactive position toward the active position.

Further, it is possible to more reliably suppress a feeling of surprise when power is transmitted, because the cushioning member includes a spring that is set to a load such that the spring is compressed before the clutch spring starts to be compressed.

According to the disclosure, it is possible to avoid positional displacement of the cushioning member that may occur if the cushioning member is involved when the first clutch member moves relative to the second clutch member. The cushioning member is accommodated in an accommodation recessed portion formed in a surface where the first clutch member and the second clutch member face each other.

According to the disclosure, it is possible to apply an urging force, generated by the cushioning member, to the second clutch member and the like substantially uniformly. Also, it is possible to stably apply the urging force. This is due to the accommodation recessed portion, including an annular groove, and the cushioning member, including of a spring having an annular shape conformed to a shape of the groove.

According to the disclosure, it is possible to enable the back-torque transmitting cam to reliably and stably move the second clutch member and to enable the cushioning member to reliably and stably apply an urging force. The back-torque transmitting cam is formed in a plurality of annular shapes in the surface where the first clutch member and the second clutch member face each other. The accommodation recessed portion is formed in a concentric circular shape at a position that is adjacent to the back-torque transmitting cam.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a power transmission device.

FIG. 2 is a longitudinal sectional view of FIG. 1.

FIG. 3 is an enlarged cross-sectional view of drive-side clutch plates, driven-side clutch plates, a back-torque transmitting cam, and the like.

FIG. 4 is a perspective view of a housing portion of a clutch housing.

FIG. 5 is a perspective view of a cover portion of the clutch housing.

FIG. 6 is a three-side plan and elevation view of a first clutch member.

FIG. 7 is a three-side plan and elevation view of a second clutch member.

FIG. 8 is a three-side plan and elevation view of a pressure member.

FIG. 9 is an exploded perspective view of the first clutch member, the second clutch member, the pressure member, and a bearing holding member.

FIG. 10 is an exploded perspective view of the first clutch member, the second clutch member, the pressure member, and the bearing holding member.

FIG. 11 is a perspective view of the first clutch member, the second clutch member, the pressure member, and the bearing holding member after having been assembled.

FIG. 12 is a three-side plan and elevation view of the bearing holding member.

FIG. 13 is a cross-section view of the function of a press-contact assisting cam.

FIG. 14 is a cross-section view of the function of a back-torque limiter cam.

FIG. 15 is a plan view of the first clutch member and the second clutch member assembled together, illustrating a state where one side surface of a protruding portion and a first contact surface (torque transmitting portion) are in contact with each other.

FIG. 16 is a plan view of the first clutch member and the second clutch member assembled together, illustrating a state where the other side surface of the protruding portion and a second contact surface (movement-amount limiting portion) are in contact with each other.

FIG. 17 is a cross-section view of the function of the back-torque transmitting cam in a state before the back-torque transmitting cam starts working.

FIG. 18 is a cross-section view of the function of the back-torque transmitting cam of the power transmission device in a state after the back-torque transmitting cam has started working.

FIG. 19 is a cross-section view of a cushioning member accommodated in an accommodation recessed portion.

FIG. 20 is a cross-section view of a state where a release spring applies urging forces to both the bearing holding member and the pressure member.

FIG. 21 is a three-side plan and elevation view of the release spring.

FIG. 22 is a graph representing the movement amount and the pressing load of an interlocking member of the power transmission device.

FIG. 23 is a graph representing the movement amount and the pressing load of an interlocking member of a power transmission device according to another embodiment.

FIG. 24 is a longitudinal sectional view of a power transmission device according to another embodiment.

FIG. 25 is a longitudinal sectional view of a power transmission device according to another embodiment.

FIG. 26 is a longitudinal sectional view of a power transmission device according to another embodiment.

FIG. 27 is a longitudinal sectional view of a power transmission device according to another embodiment with a cushioning member 12.

FIG. 28 shows a plan view and a side view of the cushioning member.

FIG. 29 is a perspective view of the cushioning member.

FIG. 30 is a longitudinal sectional view of a power transmission device according to another embodiment with a back-torque transmitting cam disposed at an outer edge of a first clutch member and a cushioning member.

FIG. 31 is a longitudinal sectional view of a power transmission device according to another embodiment with a back-torque transmitting cam disposed at an outer edge of a first clutch member and a cushioning member.

FIG. 32 is a graph representing the movement amount and the pressing load of an interlocking member of an existing power transmission device.

DETAILED DESCRIPTION

Hereafter, an embodiment of the present disclosure will be described in detail with reference to the drawings.

A power transmission device according to the present embodiment is a device that is disposed in a vehicle, such as a motorcycle, and is used to appropriately transmit or to stop transmitting the driving power of an engine to a transmission or toward the driving wheel side.

As illustrated in FIGS. 1 to 12, the power transmission device includes: a clutch housing 2 with an input gear 1 (input member) rotated by the vehicle engine driving power; a clutch member (a first clutch member 4a and a second clutch member 4b); a pressure member 5, attached on the right side (in FIG. 2) of the clutch member (the first clutch member 4a and the second clutch member 4b); a plurality of drive-side clutch plates 6; a plurality of driven-side clutch plates 7; a weight member 8 including steel ball members that can move (roll) in the radial direction in the clutch housing 2; an interlocking member 9; and an activation member 10 that can be activated by hand or by an actuator (not shown). The symbol S in the figure shows a spring damper. The symbol B1 shows a roller bearing. The symbols B2 and B3 respectively show thrust bearings.

The input gear 1 can rotate around an output shaft 3 when the driving power (rotational force) transmitted from the engine is input. The input gear 1 is coupled to the clutch housing 2 via a rivet R or the like. The clutch housing 2 includes a housing portion 2a, with a cylindrical member whose right side, in FIG. 2, is open and is coupled to the input gear 1, and a cover portion 2b that is attached so as to close the opening of the housing portion 2a. The clutch housing 2 can rotate together with the rotation of the input gear 1 due to the engine driving power.

As illustrated in FIG. 4, a plurality of cutouts 2aa are formed in the housing portion 2a of the clutch housing 2 arranged in the circumferential direction. The plurality of drive-side clutch plates 6 is attached and fit to the cutouts 2aa. Each of the drive-side clutch plates 6 includes a substantially annular plate material. The plurality of clutch plates 6 is configured to rotate together with the rotation of the clutch housing 2 and to slide in the axial direction (the left-right direction in FIG. 2).

Moreover, as illustrated in FIG. 5, a plurality of groove portions 2ba, extending in the radial direction of the cover portion 2b, is formed in the bottom surface of the cover portion 2b of the clutch housing 2. The weight member 8 is disposed in each of the groove portions 2ba. In a state where the clutch housing 2 is stopped, an engine stop or idling state, and in a state where the clutch housing 2 is rotating at a low speed, the weight member 8 is located at a radially-inner position (the position shown in FIG. 2). In a state where the clutch housing 2 is rotating at a high speed, the weight member 8 is located at a radially-outer position.

The plurality of driven-side clutch plates 7 is alternately formed with the drive-side clutch plates 6 of the clutch housing 2. The plurality of driven-side clutch plates 7 is attached to the clutch member (the first clutch member 4a and the second clutch member 4b). The clutch member is coupled to the output shaft 3 (output member) that can rotate the wheel of the vehicle. The clutch member is configured by assembling two members, the first clutch member 4a and the second clutch member 4b.

As illustrated in FIG. 6, the first clutch member 4a includes a disc-shaped member with a flange surface 4ac formed along the peripheral edge part. The first clutch member 4a is configured so that the output shaft 3 is inserted into an insertion hole 4ad (see FIGS. 2 and 6) formed at its center. The first clutch member 4a and the output shaft 3 are coupled to each other in the rotational direction as gears, respectively, mesh with each other. As illustrated in FIGS. 6, 9, and 10, in the first clutch member 4a, an inclined surface 4aa constitutes a press-contact assisting cam and an inclined surface 4ab constitutes a back-torque limiter cam.

As illustrated in FIG. 7, the second clutch member 4b includes an annular member. The second clutch member 4b is configured so that the driven-side clutch plates 7 are attached by spline fitting to a spline-fitting portion 4ba (see FIGS. 2 and 7) formed in an outer peripheral surface. As illustrated in FIGS. 9 to 11, the pressure member 5 is assembled with the clutch member (the first clutch member 4a and the second clutch member 4b). The plurality of drive-side clutch plates 6 and the driven-side clutch plates 7, in an alternately stacked state, are attached between a flange surface 5c of the pressure member 5 (see FIGS. 2 and 8) and the flange surface 4ac of the first clutch member 4a (see FIGS. 2 and 6).

As illustrated in FIG. 8, the pressure member 5 includes a disc-shaped member with the flange surface 5c formed along the peripheral edge part. The pressure member 5 is movable between an active position and an inactive position. In the active position, the pressure member 5 presses the drive-side clutch plates 6 and the driven-side clutch plates 7 against each other to be able to transmit the engine driving power to the wheel. In the inactive position (see FIG. 2), the pressure member 5 releases the press-contact force between the drive-side clutch plates 6 and the driven-side clutch plates 7 to be able to stop transmitting the engine driving power to the wheel.

To be more specific, as illustrated in FIGS. 7 and 9, 10, the spline-fitting portion 4ba formed in the second clutch member 4b has a protruding/recessed shape integrally formed along substantially the entire circumference of the outer peripheral side surface of the second clutch member 4b. When the driven-side clutch plates 7 are fit into recessed grooves of the spline-fitting portion 4ba, movement of the driven-side clutch plates 7 in the rotational direction is restricted while movement of the driven-side clutch plates 7 relative to the second clutch member 4b in the axial direction is allowed. The driven-side clutch plates 7 can rotate together with the second clutch member 4b.

The driven-side clutch plates 7 are stacked alternately with the drive-side clutch plates 6. The clutch plates 6 and 7 can be pressed against each other or the press-contact force therebetween can be released. That is, both clutch plates 6 and 7 are allowed to slide in the axial direction of the second clutch member 4b. When the pressure member 5 moves leftward in FIG. 2 and the flange surface 5c moves toward the flange surface 4ac of the first clutch member 4a, both clutch plates 6 and 7 are pressed against each other to transmit a rotational force of the clutch housing 2 to the output shaft 3, via the second clutch member 4b and the first clutch member 4a. When the pressure member 5 moves rightward in FIG. 2 and the flange surface 5c and the flange surface 4ac of the first clutch member 4a become separated from each other, the press-contact force between the clutch plates 6 and 7 is released. Thus, the first clutch member 4a and the second clutch member 4b stop following the rotation of the clutch housing 2 and transmission of a rotational force to the output shaft 3 is stopped.

In the state where the drive-side clutch plates 6 and the driven-side clutch plates 7 are pressed against each other, a rotational force (driving power of the engine) input to the clutch housing 2 is transmitted to the wheel side via the output shaft 3 (output member). In the state where the press contact between the drive-side clutch plates 6 and the driven-side clutch plates 7 is released, a rotational force (driving power of the engine) input to the clutch housing 2 can be stopped.

Moreover, as illustrated in FIGS. 6, 8, 9, and 10, in the present embodiment, the inclined surfaces 4aa and 4ab are formed in the first clutch member 4a. Inclined surfaces 5a and 5b, formed in the pressure member 5, face the inclined surfaces 4aa and 4ab. That is, the inclined surface 4aa and the inclined surface 5a contact each other to form a press-contact assisting cam. The inclined surface 4ab and the inclined surface 5b contact each other to form a back-torque limiter cam.

As illustrated in FIG. 13, a rotational force in the direction (a) is applied to the pressure member 5 when the rotational speed of the engine increases and a rotational force input to the input gear 1 and the clutch housing 2 becomes capable of being transmitted to the output shaft 3, via the first clutch member 4a and the second clutch member 4b (the weight member 8 is at the radially-outer position). Therefore, a force in the direction (c) in the figure is generated in the pressure member 5 due to the function of the press-contact assisting cam. Thus, the flange surface 5c of the pressure member 5 moves in a direction (leftward in FIG. 2) further toward the flange surface 4ac of the first clutch member 4a. The pressure member 5 increases the press-contact force between the drive-side clutch plates 6 and the driven-side clutch plates 7.

On the other hand, while the vehicle is traveling, when the rotational speed of the output shaft 3 exceeds the rotational speed of the input gear 1 and the clutch housing 2 and a back torque in the direction (b) in FIG. 14 is generated, due to the function of the back-torque limiter cam, the pressure member 5 is moved in the direction (d) in the figure to release the press-contact force between the drive-side clutch plates 6 and the driven-side clutch plates 7. Thus, it is possible to avoid damage to the power transmission device and the power source (engine side) due to the back torque.

The weight member 8 is disposed in the groove portion 2ba extending in the radial direction of the clutch housing 2 (in the present embodiment, the cover portion 2b). The weight member 8 moves from a radially-inner position (see FIG. 2) to a radially-outer position in the groove portion 2ba due to a centrifugal force generated as the clutch housing 2 rotates, to press the drive-side clutch plates 6 and the driven-side clutch plates 7 against each other. That is, the rolling surface (bottom surface) of the groove portions 2ba on which the weight member 8 rolls has an upward inclination from the radially-inner position to the radially-outer position. When the clutch housing 2 is stopped, the weight member 8 is held at the radially-inner position due to an urging force of a release spring m. When the clutch housing 2 rotates, a centrifugal force is applied to the weight member 8. This moves the weight member 8 along the upward inclination to the radially-outer position as the clutch housing 2 reaches a predetermined rotational speed.

The interlocking member 9 is composed of an annular member disposed in the clutch housing 2 (the cover portion 2b). The interlocking member 9 is fit and coupled to a groove portion formed in an inner peripheral surface of the cover portion 2b. The interlocking member 9 is rotatable together with the clutch housing 2 and movable in the left-right direction in FIG. 2. As the weight member 8 moves from the radially-inner position to the radially-outer position, the interlocking member 9 moves leftward in FIG. 2 against an urging force of the release spring (m). It can press the pressure member 5 to move the pressure member 5 from the inactive position to the active position.

The activation member 10 includes a member that can be operated by hand or by an actuator (see FIG. 2). It moves the pressure member 5 in a direction (rightward in FIG. 2) such that the press-contact force between the drive-side clutch plates 6 and the driven-side clutch plates 7 can be released. When a shifting operation is performed, for example, by an operation on a clutch pedal, a clutch lever, or the like of the vehicle, or by working of an actuator, the activation member 10 moves rightward in FIG. 2 to contact the pressure member 5, via a bearing holding member C. This moves the pressure member 5 from the active position to the inactive position. Thus, the activation member 10 can disengage the clutch (stop transmitting the power) by releasing the press-contact force between the drive-side clutch plates 6 and the driven-side clutch plates 7.

As illustrated in FIG. 2, the bearing holding member C, coupled to the activation member 10, holds a bearing B1 interposed between the activation member 10 and the pressure member 5. As illustrated in FIG. 12, the bearing holding member C includes a cylindrical member with one end. The bearing holding member has an open end portion and a top portion Cb on the opposite side of the open end portion Ca. The bearing B1, according to the present embodiment, is attached to the top portion Cb side in the bearing holding member C. A cylindrical part extends from an increased-diameter part to the open end portion Ca. Although a ball bearing is used as the bearing B1 according to the present embodiment, for example, another bearing such as a needle bearing may be used.

Moreover, as illustrated in FIGS. 2 and 20, an open end portion Ca of the bearing holding member C, according to the present embodiment, is fit into and attached to a recessed portion 4*d* formed in the clutch member (the first clutch member 4*a*). It is assembled with an inner peripheral wall surface 4*da* of the recessed portion 4*d* by socket-and-spigot joint (fitting joint). The recessed portion 4*d* includes a circular depression having a shape similar to and a size substantially the same as the outer shape of the open end portion Ca (to be strict, a size slightly larger than the open end portion Ca). By fitting the bearing holding member C into the recessed portion 4*d*, positioning and centering relative to the power transmission device are performed.

In a shifting operation, when the activation member 10 moves rightward in FIG. 2 by, for example, an operation on a clutch pedal, a clutch lever, or the like of the vehicle or by working of an actuator, the bearing holding member C moves together and contacts the pressure member 5 to move the pressure member 5 from the active position to the inactive position. Thus, the clutch is disengaged (transmission of power is stopped) by releasing the press-contact force between the drive-side clutch plates 6 and the driven-side clutch plates 7.

The release spring (m) can hold the pressure member 5 at the inactive position. The release spring (m) is compressed as the interlocking member 9 moves and the pressure member 5 moves from the inactive position toward the active position. The release spring (m) can apply an urging force while allowing movements of the interlocking member 9 and the pressure member 5 until the drive-side clutch plates 6 and the driven-side clutch plates 7 reach an engaged state before being pressed against each other (a state where the distance between the drive-side clutch plates 6 and the driven-side clutch plates 7 is zero and immediately before power transmission due to pressed contact is performed).

Moreover, as illustrated in FIG. 21, the release spring (m), according to the present embodiment, includes a coned-disc spring that can generate an urging force due to a displacement between a middle part (ma) and a peripheral edge part (mb). As illustrated in FIGS. 2 and 20, the middle part ma is attached to the top portion Cb of the bearing holding member C. The peripheral edge part mb is attached to the pressure member 5. The pressure member 5 has a projecting portion 5*d* that projects annularly. The peripheral edge part (mb) of the release spring (m) is engaged with and attached to a ring-shaped member g (for example, a circlip and the like) attached to the projecting portion 5*d*. Thus, the release spring (m), according to the present embodiment, is attached to both of the bearing holding member C and the pressure member 5. It applies an urging force (an urging force in an orientation indicated by a numeral a2 in FIG. 20) to the pressure member 5. Also, the spring can apply an urging force (an urging force in an orientation indicated by a symbol a1 in the figure) to the bearing holding member C to transmit the urging force to the activation member 10.

A clutch spring 11 includes a coil spring interposed between the interlocking member 9 and the pressure member 5. As the interlocking member 9 moves, the clutch spring 11 can press the pressure member 5 to move the pressure member 5 in a direction such that the drive-side clutch plates 6 and the driven-side clutch plates 7 are pressed against each other. Moreover, when the activation member 10 is working, the clutch spring 11 can absorb the pressing force that the pressure member 5 applies to the interlocking member 9.

The clutch spring 11, according to the present embodiment, moves together with the pressure member 5 without being compressed (deformed), until the drive-side clutch plates 6 and the driven-side clutch plates 7 reach the engaged state described above. After the drive-side clutch plates 6 and the driven-side clutch plates 7 have reached the engaged state, the clutch spring 11 is compressed in the process where the interlocking member 9 moves. The clutch spring can apply a press-contact force between the drive-side clutch plates 6 and the driven-side clutch plates 7 while allowing movement of the interlocking member 9.

That is, when the weight member 8 moves from the radially-inner position to the radially-outer position and the interlocking member 9 is pressed by the weight member 8 as the clutch housing 2 rotates, the pressing force is transmitted to the pressure member 5, via the clutch spring 11, moves the pressure member 5 leftward in FIG. 2 and presses the drive-side clutch plates 6 and the driven-side clutch plates 7 against each other. When the activation member 10 is activated in this state, although the pressure member 5 moves rightward in the figure due to the pressing force of the activation member 10, the pressing force applied to the interlocking member 9 is absorbed by the clutch spring 11. Thus, the position of the interlocking member 9 (the position of the weight member 8) is maintained.

Here, the power transmission device according, to the present embodiment, includes a back-torque transmitting cam (cam surfaces K1 and T1) that can move the second clutch member 4*b* to press the drive-side clutch plates 6 and the driven-side clutch plates 7 against each other, when a rotational force is input to the first clutch member 4*a* via the output shaft 3 (output member). As illustrated in FIGS. 6, 7, 9, and 10, the back-torque transmitting cam include cam surfaces (K1, T1) that are respectively integrally formed in mating surfaces of the first clutch member 4*a* and the second clutch member 4*b* (mating surfaces when combined).

As illustrated in FIGS. 6 and 9, the cam surface K1 includes a plurality of inclined surfaces formed along the entire circumference of the radially-inner side of the flange surface 4*ac* of the first clutch member 4*a* (the mating surface with the second clutch member 4*b*). The cam surface K1 is formed in one end surface of each of a plurality of groove portions K that are annularly formed along the peripheral edge part of the first clutch member 4*a*. That is, the plurality of groove portions K are formed in the first clutch member 4*a* so as to be arranged in the circumferential direction. One end surface of each groove portion K is an inclined surface that constitutes the cam surface K1 of the back-torque transmitting cam. The other end surface of each groove portion K is a wall surface K2 extending in the axial direction of the first clutch member 4*a*.

As illustrated in FIGS. 7 and 10, the cam surface T1 is composed of a plurality of inclined surfaces formed along the entire circumference of the bottom surface of the second clutch member 4b (the mating surface with the first clutch member 4a). The cam surface T1 is formed in one end surface of each of a plurality of projecting portions T that are annularly formed along the bottom surface of the second clutch member 4b. That is, the plurality of projecting portions T are formed in the second clutch member 4b so as to be arranged in the circumferential direction. One end surface of each projecting portion T is an inclined surface that constitutes the cam surface T1 of the back-torque transmitting cam. The other end surface of each projecting portion T is a wall surface T2 extending in the axial direction of the second clutch member 4b.

As illustrated in FIG. 17, when the projecting portion T is fit into the groove portion K to combine the first clutch member 4a and the second clutch member 4b with each other, the cam surface K1 and the cam surface T1 face each other to constitute the back-torque transmitting cam, and the wall surface K2 and the wall surface T2 face each other with a predetermined distance therebetween. When a rotational force is input to the first clutch member 4a, via the output shaft 3, because the first clutch member 4a rotates relative to the second clutch member 4b, as illustrated in FIG. 18, the second clutch member 4b is moved rightward in FIGS. 2 and 18 relative to the first clutch member 4a due to the cam function of the cam surface K1 and the cam surface T1.

As illustrated in FIG. 7, a pressing portion 4bb is formed in the second clutch member 4b on an extension line of the spline-fitting portion 4ba. When the second clutch member 4b moves rightward in FIG. 2, the pressing portion 4bb presses in the same direction as the driven-side clutch plate 7 on the leftmost side in the figure, which is one of the drive-side clutch plates 6 and the driven-side clutch plates 7 that are attached in a stacked state. Thus, even when the pressure member 5 is at the inactive position, it is possible to press the drive-side clutch plates 6 and the driven-side clutch plates 7 against each other. Also, when a rotational force is input from the output shaft 3 (output member), it is possible to transmit the rotational force to the engine side to apply an engine brake.

In particular, the back-torque transmitting cam, according to the present embodiment, move the second clutch member 4b in a direction toward the interlocking member 9 (rightward in FIG. 2) to maintain contact between the interlocking member 9 and the weight member 8. That is, when the back-torque transmitting cam starts working and moves the second clutch member 4b rightward in FIG. 2, the back-torque transmitting cam presses the drive-side clutch plates 6 and the driven-side clutch plates 7 against each other and presses the pressure member 5 in the same direction. Therefore, the pressing force is transmitted to the interlocking member 9, via the clutch spring 11, and contact between the interlocking member 9 and the weight member 8 is maintained.

If the interlocking member 9 and the weight member 8 are separated from each other when the back-torque transmitting cam is working, even when the weight member 8 subsequently moves between the radially-inner position and the radially-outer position as the clutch housing 2 rotates, it may not be possible for the interlocking member 9 to follow the movement. In contrast, with the present embodiment, it is possible to maintain contact between the interlocking member 9 and the weight member 8 even when the back-torque transmitting cam is working. Thus, the interlocking member 9 can stably follow the movement of the weight member 8.

Moreover, the plurality of the cam surfaces K1 and T1 of the back-torque transmitting cam, according to the present embodiment, are formed along the annular shape of the driven-side clutch plates 7 attached to the second clutch member 4b. That is, the cam surfaces K1 and T1 are formed along the projected-image shape (annular shape) of the driven-side clutch plates 7 that are pressed by the pressing portion 4bb when the back-torque transmitting cam works. Thus, due to the cam function of the back-torque transmitting cam, the pressing portion 4bb can apply a substantially uniform pressing force to the driven-side clutch plates 7. Thus, it is possible to press the drive-side clutch plates 6 and the driven-side clutch plates 7 against each other more efficiently.

Furthermore, the back-torque transmitting cam, according to the present embodiment, (a cam constituted by the cam surface K1 and the cam surface T1) can start working before the back-torque limiter cam (a cam constituted by the inclined surface 4ab and the inclined surface 5b) starts working. That is, the clearance (the dimension of the gap) between the cam surface K1 and the cam surface T1 is smaller than the clearance (the dimension of the gap) between the inclined surface 4ab and the inclined surface 5b. Thus, the back-torque transmitting cam can start working before the back-torque limiter cam starts working.

Moreover, the power transmission device, according to the present embodiment, includes a torque transmitting portion formed in each of the first clutch member 4a and the second clutch member 4b, that can transmit a rotational force, which has been transmitted to the second clutch member 4b, to the first clutch member 4a without using the back-torque transmitting cam (the cam surfaces K1 and the cam surfaces T1). A movement-amount limiting portion, formed in each of the first clutch member 4a and the second clutch member 4b, limits the movement amount of the second clutch member 4b due to the back-torque transmitting cam (the cam surfaces K1 and the cam surfaces T1).

That is, as illustrated in FIGS. 6 and 9, a plurality of (in the present embodiment, three) protruding portions F are integrally formed in the first clutch member 4a and arranged at regular intervals in the circumferential direction. As illustrated in FIGS. 7 and 9, projecting portions G, extending inward, are integrally formed in the second clutch member 4b. As illustrated in FIGS. 15 and 16, when the first clutch member 4a and the second clutch member 4b are assembled together, one protruding portion F is interposed between two projecting portions G. One side surface F1 of the protruding portion F and the contact surface (first contact surface G1) of one of the projecting portions G face each other. The other side surface F2 of the protruding portion F and the contact surface (second contact surface G2) of the other projecting portion G face each other.

One side surface F1 of the protruding portion F, formed in the first clutch member 4a, and the first contact surface G1 of the projecting portion G, formed in the second clutch member 4b, constitute the torque transmitting portion, according to the present embodiment. That is, when the pressure member 5 moves to the active position, to press the drive-side clutch plates 6 and the driven-side clutch plates 7 against each other, the clutch is engaged (driving power is transmitted), while the wall surface K2 of the groove portion K and the wall surface T2 of the projecting portion T of the back-torque transmitting cam are maintained in a separated state (see FIG. 17), as illustrated in FIG. 15. Thus, one side surface F1 of the protruding portion F and the first contact surface G1 of the projecting portion G contact each other. A rotational force of the second clutch member 4b can be received and transmitted to the first clutch member 4a.

The other side surface F2 of the protruding portion F, formed in the first clutch member 4a, and the second contact surface G2 of the other projecting portion G, formed in the second clutch member 4b, constitute the movement-amount limiting portion, according to the present embodiment. That is, when a rotational force is input to the first clutch member 4a via the output shaft 3, the first clutch member 4a and the second clutch member 4b rotate relative to each other. Therefore, the second clutch member 4b moves (see FIG. 18) due to the cam function of the cam surface K1 of the groove portion K and the cam surface T1 of the projecting portion T of the back-torque transmitting cam. When the movement amount reaches a set value, as illustrated in FIG. 16, the other side surface F2 of the protruding portion F and the second contact surface G2 of the projecting portion G contact each other. Thus, rotation of the second clutch member 4b relative to the first clutch member 4a is restricted. Accordingly, it is possible to limit the movement amount of the second clutch member 4b when the back-torque transmitting cam is working.

In the present embodiment, the protruding portion F is formed in the first clutch member 4a. The projecting portion G is formed in the second clutch member 4b. Alternatively, the projecting portion G may be formed in the first clutch member 4a, and the protruding portion F may be formed in the second clutch member 4b. In this case, one side surface F1 of the protruding portion F, formed in the second clutch member 4b, and the first contact surface G1 of one projecting portion G, formed in the first clutch member 4a, constitute the torque transmitting portion, according to the present embodiment. The other side surface F2 of the protruding portion F, formed in the second clutch member 4b, and the second contact surface G2 of the other projecting portion G, formed in the first clutch member 4a, constitute the movement-amount limiting portion, according to the present embodiment.

Next, the function of the back-torque transmitting cam in the present embodiment will be described.

As illustrated in FIG. 2, when the engine is stopped or idling or the rotational speed of the input gear 1 is low, the weight member 8 is at the radially-inner position and the pressure member 5 is at the inactive position. Thus, the driving power of the engine is not transmitted to the input gear 1. At this time, when a rotational force is input to the first clutch member 4a via the output shaft 3 (output member), due to the cam function of the back-torque transmitting cam, the second clutch member 4b moves rightward in the figure. The drive-side clutch plates 6 and the driven-side clutch plates 7 are pressed against each other to transmit a rotational force to the engine side.

When the vehicle starts to move after having been stopped or idling, the rotational speed of the input gear 1 changes from a low rotational speed to a high rotational speed (middle rotational speed range). The weight member 8 is located between the radially-inner position and the radially-outer position and the pressure member 5 is located at the active position. At this time, when a rotational force is input to the first clutch member 4a, via the output shaft 3 (output member) as, for example, acceleration pedal is released on a downward slope, due to the cam function of the back-torque transmitting cam, the second clutch member 4b moves rightward in the figure, and the drive-side clutch plates 6 and the driven-side clutch plates 7 are pressed against each other to transmit a rotational force to the engine side.

After the vehicle has started, when the vehicle accelerates and travels in a high speed range, the weight member 8 is located at the radially-outer position and the pressure member 5 is located at the active position. Thus, the rotational speed of the input gear 1 is a high rotational speed. At this time, when a rotational force is input to the first clutch member 4a, via the output shaft 3 (output member), in response to shift down or the like, due to the cam function of the back-torque transmitting cam, the second clutch member 4b moves rightward in the figure, and the drive-side clutch plates 6 and the driven-side clutch plates 7 are pressed against each other to transmit a rotational force to the engine side.

Here, the present embodiment includes a cushioning member 12 that is interposed between the first clutch member 4a and the second clutch member 4b. The cushioning member 12, by being compressed (spring is deformed) applies an urging force while allowing movements of the interlocking member 9 and the pressure member 5, in the process where the interlocking member 9 moves and the pressure member 5 moves from the inactive position toward the active position. The cushioning member 12 includes a spring that is set to a load such that the spring is compressed before the clutch spring 11 starts to be compressed. As illustrated in FIGS. 2, 3, and 19, the cushioning member 12 is assembled by being accommodated in an accommodation recessed portion 4c. The recessed portion 4c is formed in a surface where the first clutch member 4a and the second clutch member 4b face each other (to be specific, a surface of the first clutch member 4a facing the second clutch member 4b).

To be more specific, as illustrated in FIG. 6, the accommodation recessed portion 4c includes an annular groove. The cushioning member 12 includes a coned-disc spring with an annular shape conformed to the shape of the groove. As illustrated in FIG. 19, the accommodation recessed portion 4c includes a groove with a wall surface 4ca on the radially-inner side and a wall surface 4cb on the radially-outer side. The cushioning member 12, including an annular spring, is conformed to the shape of the groove and fit into the accommodation recessed portion 4c.

As described above, the back-torque transmitting cam, according to the present embodiment, is formed in a plurality of annular shapes in a surface where the first clutch member 4a and the second clutch member 4b face each other. As illustrated in FIG. 6, the accommodation recessed portion 4c is formed in a concentric circular shape at a position that is adjacent to the back-torque transmitting cam (in the present embodiment, on the radially-inner side of the position where the back-torque transmitting cam is formed). In the present embodiment, the accommodation recessed portion 4c is formed in a concentric circular shape at a position on the radially-inner side of the position of the back-torque transmitting cam. However, the accommodation recessed portion 4c may be formed in a concentric circular shape at a position on the radially-outer side of the position of the back-torque transmitting cam. In this case, as illustrated in FIG. 24, the cushioning member 12 may be configured to apply an urging force to a part (disc pack) where the drive-side clutch plates 6 and the driven-side clutch plates 7 are stacked, in a direction such that the drive-side clutch plates 6 and the driven-side clutch plates 7 are pressed against each other.

Next, the function the cushioning member 12, according to the present embodiment, will be described in comparison with an existing device that does not have the cushioning member 12.

First, the function of a case where the cushioning member 12 is not provided, in contrast to the present embodiment, will be described with reference to the graph of FIG. 32. A graph having the movement amount (mm) of the interlocking member 9 along the horizontal axis and the pressing load (N) generated in the interlocking member 9 along the vertical axis. In the graph of FIG. 32, P1 indicates the pressing load of the interlocking member 9 at a time when the deformation amount (compression amount) of the release spring m is the maximum (at a time of reaching the maximum load of the release spring m). P2 indicates the pressing load of the interlocking member 9 at a time when the clutch spring 11 starts to be deformed (at a time of reaching a set load of the clutch spring 11). In FIGS. 22 and 23, P3 indicates the pressing load of the interlocking member 9 at a time when the cushioning member 12 starts to be deformed (at a time of reaching a set load of the cushioning member 12).

In the process where the rotational speed of the engine increases and the weight member 8 moves from the radially-inner position to the radially-outer position to move the interlocking member 9, the release spring m is deformed and the clutch spring 11 is not deformed (that is, the interlocking member 9 and the pressure member 5 move together) until the movement amount of the interlocking member 9 reaches (a), and, when the movement amount of the interlocking member 9 reaches (a), although the pressing load (N) increases from P1 to P2, the interlocking member 9 stops moving, and becomes a dead zone.

When the pressing load (N) reaches P2 (the set load of the clutch spring 11) from such a state, the clutch spring 11 starts to be deformed. The pressing load (N) increases in accordance with the movement of the interlocking member 9. Thus, the interlocking member 9 and the pressure member 5 stop until the pressing load (N) reaches from P1 to P2, and, as soon as the pressing load (N) reaches P2, the clutch spring 11 starts to be compressed. The clutch plates (the drive-side clutch plates 6 and the driven-side clutch plates 7) are pressed against each other to transmit power, and thus a feeling of surprise occurs when power is transmitted.

In contrast, in the present embodiment with the cushioning member 12 including a spring set to a load such that the spring is compressed before the clutch spring 11 starts to be compressed in the process where the interlocking member 9 moves (a spring whose set load is set to P3). Therefore, as illustrated in FIG. 22, the cushioning member 12 starts to be compressed (starts to be deformed) from the time when the movement amount of the interlocking member 9 reaches β, and compression is continued to the time when and the pressing load reaches P2.

That is, according to this graph, in the process where the interlocking member 9 moves as the rotational speed of the engine increases and the weight member 8 moves from the radially-inner position to the radially-outer position, the cushioning member 12 is compressed from the time when the movement amount of the interlocking member 9 becomes β and the pressing load (N) reaches P3, and subsequently, the clutch spring 11 starts to be deformed (starts to be compressed) as the movement amount of the interlocking member 9 reaches α and the pressing load (N) becomes P2.

Thus, when the interlocking member 9 starts moving, the pressing load (N) becomes the set load of the release spring (m) and the release spring (m) starts to be deformed (starts to be compressed). When the movement amount of the interlocking member 9 reaches β, the cushioning member 12 starts to be deformed (starts to be compressed). Subsequently, when the movement amount of the interlocking member 9 reaches (a), the release spring (m) reaches the maximum load and the pressing load (N) reaches the set load (P2) of the clutch spring 11, and thereby the clutch spring 11 starts to be deformed (starts to be compressed). Until the clutch spring 11 reaches the maximum load (the upper limit of the working load), the clutch spring 11 continues to be compressed (continues to be deformed) due to the movement of the interlocking member 9.

Accordingly, when the movement amount of the interlocking member 9 is between β and α, the cushioning member 12 is continuously compressed (deformed) to allow the movement of the interlocking member 9 in the process where the pressing load increases from P3 to P2. Therefore, it is possible to reduce the dead zone of the existing device and to smoothly and continuously move the weight member 8 and the interlocking member 9. Thus, it is possible to suppress shock when the clutch is engaged and to suppress a feeling of surprise when power is transmitted.

As illustrated in FIG. 22, the cushioning member 12 is configured to be continuously compressed (continues to be deformed) when the pressing load (N) is between P3 and P2. However, as illustrated in FIG. 23, the cushioning member 12 may be set so that the cushioning member 12 starts to be compressed (starts to be deformed) from the time when the movement amount of the interlocking member 9 becomes β and the pressing load (N) reaches P3. The cushioning member 12 is continuously compressed (continued to be deformed) until the time when the pressing load (N) becomes P4 that is lower than P2. Even in this case, because it is possible to reduce the existing dead zone than before, it is possible to move the weight member 8 and the interlocking member 9 smoothly and continuously, to suppress shock when the clutch is engaged, and to suppress a feeling of surprise when power is transmitted.

The present embodiment includes the cushioning member 12 interposed between the first clutch member 4a and the second clutch member 4b. The cushioning member 12 applies an urging force while allowing movements of the interlocking member 9 and the pressure member 5 by being compressed in the process where the interlocking member 9 moves and the pressure member 5 moves from the inactive position toward the active position. Therefore, with the present embodiment, it is possible to suppress a feeling of surprise when power is transmitted and to improve operability while efficiently utilizing a space that is obtained by the arrangement of the first clutch member 4a and the second clutch member 4b.

The cushioning member 12, according to the present embodiment, includes a spring that is set to a load such that the spring is compressed before the clutch spring 11 starts to be compressed. Therefore, it is possible to more reliably suppress a feeling of surprise when power is transmitted. In particular, it is possible to set, in various ways, the feeling (driving-start feeling) when power is transmitted in accordance with the type of a vehicle where the present device is applied by appropriately setting the set load and the working load of the cushioning member 12.

Moreover, the cushioning member 12, according to the present embodiment, is accommodated in the accommodation recessed portion 4c formed in a surface where the first clutch member 4a and the second clutch member 4b face each other. Therefore, it is possible to avoid positional displacement of the cushioning member 12 that may occur if the cushioning member 12 is involved when the first clutch member 4a moves relative to the second clutch member 4b. The accommodation recessed portion 4c, according to the present embodiment, is formed in a surface of the first clutch member 4a facing the second clutch member 4*b*. However, the accommodation recessed portion 4*c* may be formed in a surface of the second clutch member 4*b* facing the first clutch member 4*a*.

Furthermore, the accommodation recessed portion 4*c*, according to the present embodiment, includes an annular groove. The cushioning member 12 includes a spring with an annular shape conformed to the shape of the groove. Therefore, it is possible to apply an urging force, generated by the cushioning member 12, to the second clutch member 4*b* and the like substantially uniformly and it is possible to apply the urging force stably. The back-torque transmitting cam, according to the present embodiment, is formed in a plurality of annular shapes in a surface where the first clutch member 4*a* and the second clutch member 4*b* face each other. The accommodation recessed portion 4*c* is formed in a concentric circular shape at a position that is adjacent to the back-torque transmitting cam. Therefore, it is possible to enable the back-torque transmitting cam to reliably and stably move the second clutch member 4*b* and to enable the cushioning member 12 to reliably and stably apply an urging force.

In addition, the bearing holding member C, according to the present embodiment, includes a cylindrical member with one open end. The open end portion Ca is fit into and attached to the recessed portion 4*d* formed in the clutch member (the first clutch member 4*a*) attached in a socket-and-spigot joint state. Therefore, it is easy to assemble the bearing holding member C and it is possible to stably operate the bearing holding member C when a shifting operation is performed.

The power transmission device includes the release spring (m) that can apply an urging force to the pressure member 5 while allowing movements of the interlocking member 9 and the pressure member 5 until the drive-side clutch plates 6 and the driven-side clutch plates 7 reach an engaged state before the drive-side clutch plates 6 and the driven-side clutch plates 7 are pressed against each other. The release spring (m) is attached between the bearing holding member C and the pressure member 5. The spring (m) applies an urging force to the pressure member 5 and can apply an urging force to the bearing holding member C to transmit the urging force to the activation member 10. Therefore, it is possible to use the release spring (m) as a spring to prevent play of a shift operation means, and to reduce the number of components.

Moreover, the release spring (m), according to the present embodiment. includes a coned-disc spring that can generate an urging force due to a displacement between the middle part ma and the peripheral edge part (mb). The middle part ma is attached to the bearing holding member C and the peripheral edge part (mb) is attached to the pressure member 5. Therefore, it is possible to stably apply urging forces of the release spring (m) to both the bearing holding member C and the pressure member 5.

Furthermore, the clutch member, according to the present embodiment, includes the first clutch member 4*a*, coupled to the output shaft 3 (output member), the second clutch member 4*b*, attached to the driven-side clutch plates 7, and a back-torque transmitting cam. The back-torque limiting cam presses the drive-side clutch plates 6 and the driven-side clutch plates 7 against each other by moving the second clutch member 4*b* when a rotational force is input to the first clutch member 4*a*, via the output shaft 3 (output member). The recessed portion 4*d* is formed in the first clutch member 4*a*. Therefore, it is possible to avoid the bearing holding member C from interfering with movement of the second clutch member 4*b* due to the back-torque transmitting cam. Also, it is possible to enable the back-torque transmitting cam to smoothly move each of the bearing holding member C and the second clutch member 4*b*.

With the embodiment described above, the back-torque transmitting cam can move the second clutch member 4*b* in a direction toward the interlocking member 9 to maintain contact between the interlocking member 9 and the weight member 8. Therefore, it is possible to press the drive-side clutch plates 6 and the driven-side clutch plates 7 against each other to transmit a rotational force on the wheel side to the engine side to apply an engine brake. It is also possible to stably perform activation by the weight member 8 when an engine brake is applied.

The back-torque transmitting cam, according to the present embodiment, includes the cam surfaces (K1, T1), respectively, integrally formed in the first clutch member 4*a* and the second clutch member 4*b*. The cam surfaces (K1, T1) are respectively formed in the mating surfaces of the first clutch member 4*a* and the second clutch member 4*b*. Therefore, it is possible to enable the back-torque transmitting cam to reliably and smoothly move the second clutch member 4*b*.

Moreover, the power transmission device includes a press-contact assisting cam including the inclined surface 4*aa*, of the first clutch member 4*a*, and the inclined surface 5*a*, of the pressure member 5, facing each other. This increases the press-contact force between the drive-side clutch plates 6 and the driven-side clutch plates 7 when a rotational force, input to the input gear 1, (input member) becomes capable of being transmitted to the output shaft 3 (output member). Therefore, it is possible to apply a press-contact force due to the press-contact assisting cam in addition to a press-contact force due to the movement of the weight member 8 by a centrifugal force. Thus, it is possible to press the drive-side clutch plates 6 and the driven-side clutch plates 7 against each other more smoothly and more reliably.

Furthermore, the power transmission device includes a back-torque limiter cam including the inclined surface 4*ab*, of the first clutch member 4*a*, and the inclined surface 5*b*, of the pressure member 5, facing each other. The back-torque limiter cam releases the press-contact force between the drive-side clutch plates 6 and the driven-side clutch plates 7 when the rotational speed of the output shaft 3 (output member) exceeds the rotational speed of the input gear 1 (input member) and the clutch member (the first clutch member 4*a*) and the pressure member 5 rotate relative to each other. Therefore, it is possible to avoid excessive driving power from being transmitted to the engine side via the input gear 1 when the weight member 8 is at the radially-outer position. Also, it is possible to reliably activate the back-torque transmitting cam because the back-torque transmitting cam is activated before the back-torque limiter cam starts working.

In addition, the present embodiment includes a back-torque transmitting cam that moves the second clutch member 4*b* to press the drive-side clutch plates 6 and the driven-side clutch plates 7 against each other when a rotational force is input to the first clutch member 4*a*, via the output shaft 3 (output member). A torque transmitting portion, formed in each of the first clutch member 4*a* and the second clutch member 4*b*, can transmit a rotational force that has been transmitted to the second clutch member 4*b*, to the first clutch member 4*a* without using the back-torque transmitting cam (the cam surface K1 and the cam surface T1). Therefore, it is possible to apply an engine brake by pressing the drive-side clutch plates 6 and the driven-side clutch plates 7 against each other to transmit a rotational force on the wheel side to the engine side. Thus, it is possible to stably perform power transmission when the weight member 8 moves to the radially-outer position and the pressure member 5 moves to the active position.

Further, the power transmission device includes the movement-amount limiting portion formed in each of the first clutch member 4a and the second clutch member 4b that limits the movement amount of the second clutch member 4b due to the back-torque transmitting cam. Therefore, it is possible to enable the back-torque transmitting cam to move the second clutch member 4b in a set range.

Moreover, the protruding portion F is formed in either one of the first clutch member 4a and the second clutch member 4b, The torque transmitting portion includes the one side surface F1 of protruding portion F and the first contact surface G1 that receives a rotational force by contacting the one side surface F1. The movement-amount limiting portion includes the other side surface F2 of the protruding portion F and the second contact surface G2 that limit the movement amount by contacting the other side surface F2. Therefore, the protruding portion F can function as both the torque transmitting portion and the movement-amount limiting portion.

Heretofore, the present embodiment has been described. However, the present disclosure is not limited to this. For example, as illustrated in FIGS. 25 and 26, the present disclosure may be applied to a power transmission device where a weight member 8 is movably disposed in a housing portion 2a of a clutch housing 2. The power transmission device includes, as with the embodiment described above, a first clutch member 4a, a second clutch member 4b, a back-torque transmitting cam, and a cushioning member 12 interposed between the first clutch member 4a and the second clutch member 4b.

FIG. 25 illustrates an embodiment where a cushioning member 12 is attached to a surface of the first clutch member 4a facing the second clutch member 4b. FIG. 26 illustrates an embodiment where a cushioning member 12 that applies an urging force to a part (disc pack) of the first clutch member 4a where the drive-side clutch plates 6 and the driven-side clutch plates 7 are stacked is attached to the surface. A bearing holding member C' can be moved by an activation member 10'. A release spring m' includes a coil spring that is attached to both the bearing holding member C' and the pressure member 5.

Moreover, instead of the cushioning member 12 including a coned-disc spring, another elastic member may be used. For example, as illustrated in FIG. 27, a cushioning member 12' including a wave spring disposed in an accommodation recessed portion 4c. As illustrated in FIGS. 28 and 29, the wave spring includes a C-shaped member with a cutout portion 12'a in a part of an annular shape, has a wave shape with respect to the thickness direction t, and can generate an elastic force. The wave spring is interposed between the first clutch member 4a and the second clutch member 4b. The wave spring can apply an urging force, by being compressed, while allowing movements of the interlocking member 9 and the pressure member 5 in the process where the interlocking member 9 moves and the pressure member 5 moves from the inactive position toward the active position.

In the power transmission device illustrated in the figure, the bearing holding member C has a plurality of (in the present embodiment, three) communication holes Cc formed in a side wall. This allows oil supplied to the inside of the bearing holding member C to flow to the outside via an oil flow path r. An activation member 10'' is engaged with a roller bearing B1 of the bearing holding member C, and can move the pressure member 5 between the active position and the inactive position by moving in the left-right direction in the figure due to an operation by a driver or by working of an actuator.

Furthermore, as illustrated in FIG. 30, a back-torque transmitting cam (a cam surface K1 and a cam surface T1) may be disposed in an outer peripheral edge part of each of a first clutch member 4a and a second clutch member 4b. With the power transmission device, because the back-torque transmitting cam is disposed in the outer peripheral edge part of each of the first clutch member 4a and the second clutch member 4b, the function of the cam can be enhanced, and the moving force of the second clutch member 4b can be set to be large. In the figure, a cushioning member 12, including a coned-disc spring, is disposed on the radially-inner side of the back-torque transmitting cam (the cam surface K1 and the cam surface T1). However, a cushioning member 12' including a wave spring, instead of a coned-disc spring, may be disposed.

In the present embodiment, the bearing holding member C includes a cylindrical member with one end open. The open end portion Ca is fit into and attached to the recessed portion 4d formed in the clutch member (the first clutch member 4a). However, a bearing holding member having another shape may be used. Also, an attachment structure that differs from a configuration (so-called socket-and-spigot joint) such that the bearing holding member is fit into a recessed portion formed in the clutch member may be used. Note that the power transmission device according to the present disclosure can be applied to various multiple-disc clutch power transmission devices for, in addition to a motorcycle, an automobile, a three-wheeled or four-wheeled ATV, a general-purpose machine, and the like.

The clutch member can be applied to a power transmission device with a different outer shape or having another additional function, as long as the power transmission device includes a first clutch member, coupled to the output member, a second clutch member attached to the driven-side clutch plates, a back-torque transmitting cam and a cushioning member. The back-torque transmitting cam presses the drive-side clutch plates and the driven-side clutch plates against each other by moving the second clutch member when a rotational force is input to the first clutch member, via the output member. The cushioning member, interposed between the first clutch member and the second clutch member, by being compressed, applies an urging force while allowing movements of the interlocking member and the pressure member in the process where the interlocking member moves and the pressure member moves from the inactive position to the active position.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmission device comprising:
   a clutch member housed in a clutch housing that rotates together with an input member rotated by engine driving power of a vehicle and including a plurality of drive-side clutch plates, the clutch member including a plurality of driven-side clutch plates formed alternately with the drive-side clutch plates of the clutch housing and the clutch member coupled to an output member rotating a wheel of the vehicle;

a weight member movable from a radially-inner position to a radially-outer position due to a centrifugal force generated as the clutch housing rotates;

an interlocking member switching the drive-side clutch plates and the driven-side clutch plates from a non-operating state, where the press-contact force between the drive-side clutch plates and the driven-side clutch plates is released, to an operating state where the driving power of the engine is transmitted to the wheel by pressing the drive-side clutch plates and the driven-side clutch plates against each other as the weight member moves from the radially-inner position to the radially-outer position;

the clutch member further comprising:

a first clutch member coupled to the output member;

a second clutch member attached to the driven-side clutch plates;

a back-torque transmitting cam pressing the drive-side clutch plates and the driven-side clutch plates against each other by moving the second clutch member when a rotational force is input to the first clutch member via the output member;

a cushioning member applying an urging force while enabling movement of the interlocking member in a process where the interlocking member moves and the drive-side clutch plates and the driven-side clutch plates switch from the non-operating state to the operating state;

the back-torque transmitting cam includes a first portion including a first cam surface and a second portion including a second cam surface, the second cam surface facing the first cam surface when the first portion and the second portion are positioned to face each other, and the second portion extends in an axial direction of the output member and overlaps with the cushioning member when viewed from a radial direction of the output member.

2. The power transmission device according to claim 1, wherein a length of the second portion is longer than a length of the cushioning member with respect to the axial direction of the output member.

3. The power transmission device according to claim 1, wherein an accommodation recessed portion, formed in a surface where the first clutch member and the second clutch member face each other, accommodated the cushioning member.

4. The power transmission device according to claim 3, wherein the accommodation recessed portion includes an annular groove and the cushioning member includes a spring with an annular shape conformed to a shape of the groove.

5. The power transmission device according to claim 4, wherein the back-torque transmitting cam is formed in a plurality of annular shapes in the surface where the first clutch member and the second clutch member face each other, and the accommodation recessed portion is formed in a concentric circular shape at a position that is adjacent to the back-torque transmitting cam.

6. A power transmission device comprising:

a clutch member housed in a clutch housing that rotates together with an input member rotated by engine driving power of a vehicle and including a plurality of drive-side clutch plates, the clutch member including a plurality of driven-side clutch plates formed alternately with the drive-side clutch plates of the clutch housing and the clutch member coupled to an output member rotating a wheel of the vehicle;

a weight member movable from a radially-inner position to a radially-outer position due to a centrifugal force generated by rotation of the clutch housing;

an interlocking member switching the drive-side clutch plates and the driven-side clutch plates from a non-operating state; where the press-contact force between the drive-side clutch plates and the driven-side clutch plates is released, to an operating state, where the driving power of the engine is transmitted to the wheel by pressing the drive-side clutch plates and the driven-side clutch plates against each other as the weight member moves from the radially-inner position to the radially-outer position;

the clutch member further comprising:

a first clutch member coupled to the output member;

a second clutch member attached to the driven-side clutch plates;

a back-torque transmitting cam pressing the drive-side clutch plates and the driven-side clutch plates against each other by moving the second clutch member when a rotational force is input to the first clutch member via the output member;

a cushioning member applying an urging force while enabling movement of the interlocking member in a process where the interlocking member moves and the drive-side clutch plates and the driven-side clutch plates switch from the non-operating state to the operating state;

the back-torque transmitting cam includes a first portion including a first cam surface and a second portion including a second cam surface, the second cam surface facing the first cam surface when the first portion and the second portion are positioned to face each other;

the second portion extends in an axial direction of the output member; and an end portion of the cushioning member on a weight member side overlaps with the second portion when viewed from a radial direction of the output member.

7. A power transmission device comprising:

a clutch member housed in a clutch housing that rotates together with an input member rotated by engine driving power of a vehicle and including a plurality of drive-side clutch plates, the clutch member including a plurality of driven-side clutch plates formed alternately with the drive-side clutch plates of the clutch housing and the clutch member coupled to an output member rotating a wheel of the vehicle;

a weight member movable from a radially-inner position to a radially-outer position due to a centrifugal force generated by roration of the clutch housing;

an interlocking member switching the drive-side clutch plates and the driven-side clutch plates from a non-operating state, where the press-contact force between the drive-side clutch plates and the driven-side clutch plates is released, to an operating state, where the driving power of the engine is transmitted to the wheel by pressing the drive-side clutch plates and the driven-side clutch plates against each other as the weight member moves from the radially-inner position to the radially-outer position;

the clutch member further comprises:

a first clutch member coupled to the output member;

a second clutch member attached to the driven-side clutch plates;

a back-torque transmitting cam pressing the drive-side clutch plates and the driven-side clutch plates against each other by moving the second clutch member when a rotational force is input to the first clutch member via the output member, a cushioning member applying an urging force while enabling movement of the interlocking member in a process where the interlocking member moves and the drive-side clutch plates and the driven-side clutch plates switch from the non-operating state to the operating state, the back-torque transmitting cam includes a first portion including a first cam surface and a second portion including a second cam surface, the second cam surface facing the first cam surface when the first portion and the second portion are positioned to face each other, the second portion extends in an axial direction of the output member, and an end portion of the cushioning member on an opposite side of the weight member overlaps with the second portion when viewed from a radial direction of the output member.

* * * * *

UNITED STATES PATENT AND TRADEMARK OFFICE
CERTIFICATE OF CORRECTION

PATENT NO. : 11,603,892 B2
APPLICATION NO. : 17/861228
DATED : March 14, 2023
INVENTOR(S) : Yoshihiko Ozawa et al.

It is certified that error appears in the above-identified patent and that said Letters Patent is hereby corrected as shown below:

In the Specification

Column 14
Line 25           delete "4c" and insert --4d--

Column 15
Line 24           delete "(a)," and insert --($\alpha$),--
Line 25           delete "(a)," and insert --($\alpha$),--

Signed and Sealed this
Twentieth Day of June, 2023

Katherine Kelly Vidal
*Director of the United States Patent and Trademark Office*